United States Patent
Ott et al.

(10) Patent No.: US 12,209,638 B2
(45) Date of Patent: Jan. 28, 2025

(54) PLANETARY GEARBOX SYSTEM AND METHOD THEREFOR

(71) Applicant: Textron Innovations Inc., Providence, RI (US)

(72) Inventors: Charles J. Ott, Keller, TX (US); Nathaniel Bernklau, Keller, TX (US); Trenton Hamm, Cleburne, TX (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 18/329,189

(22) Filed: Jun. 5, 2023

(65) Prior Publication Data
US 2024/0401672 A1    Dec. 5, 2024

(51) Int. Cl.
| | |
|---|---|
| *F16H 1/28* | (2006.01) |
| *F16H 1/34* | (2006.01) |
| *F16H 57/08* | (2006.01) |

(52) U.S. Cl.
CPC .............. *F16H 1/34* (2013.01); *F16H 57/082* (2013.01); *F16H 2001/2881* (2013.01); *F16H 2057/085* (2013.01)

(58) Field of Classification Search
CPC .... F16H 1/34; F16H 57/082; F16H 2057/085; F16H 2001/2881
See application file for complete search history.

(56) References Cited

U.S. PATENT DOCUMENTS

| | | | | |
|---|---|---|---|---|
| 2,700,311 | A | * | 1/1955 | Bade ..................... F16H 37/00 74/411 |
| 3,144,790 | A | | 8/1964 | Davis, Jr. et al. |
| 5,472,386 | A | | 12/1995 | Kish |
| 5,910,066 | A | * | 6/1999 | Schulz ................. F16H 1/2863 475/331 |
| 5,957,804 | A | * | 9/1999 | Schulz ..................... F16H 1/46 475/342 |
| 6,966,865 | B2 | * | 11/2005 | Drago ..................... F16H 1/28 475/342 |
| 7,076,875 | B2 | * | 7/2006 | Puetz ..................... F16H 55/17 409/12 |
| 7,507,180 | B2 | | 3/2009 | Robuck |
| 8,517,672 | B2 | * | 8/2013 | McCooey ................ F02K 3/06 415/124.2 |
| 10,253,848 | B2 | * | 4/2019 | Hatch ..................... F16H 57/08 |
| 10,358,202 | B2 | * | 7/2019 | Gil ........................ B63H 20/14 |

FOREIGN PATENT DOCUMENTS

| | | | | |
|---|---|---|---|---|
| DE | 102020128826 A1 | * | 5/2022 | |
| EP | 1396660 A2 | * | 3/2004 | ........... F16H 1/2836 |

* cited by examiner

*Primary Examiner* — Sherry L Estremsky
(74) *Attorney, Agent, or Firm* — Whitaker Chalk Swindle & Schwartz PLLC; Enrique Sanchez, Jr.; Juan Vasquez

(57) ABSTRACT

An improved compound planetary gear system. In embodiments, a compound planetary gear system includes at least one planet pinion including a main shaft having a first gear for meshing with a sun gear and a second gear for meshing with a ring gear, and a carrier for supporting the at least one planet pinion. Teeth of the first gear are configured with a first helical angle with respect to a longitudinal angle of the at least one planet pinion, teeth of the second gear are configured with a second helical angle with respect to the longitudinal angle of the at least one planet pinion, the first helical angle different from the second helical angle.

16 Claims, 27 Drawing Sheets

PLANETARY GEARBOX SYSTEM AND METHOD THEREFOR

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

The present disclosure generally relates to planetary gear systems, and more specifically to an enhanced compound planetary gear system.

BACKGROUND

Gear systems are extremely useful, and commonplace, in our world. A gear system allows for the transfer of power and/or speed from one part of a system to another. The gear system also allows for controlling the transfer of power and/or speed, such as by configuring the layout, size, number, etc., of the gears within the gear system or the gear teeth. A particular type of gear system is a planetary gear system, which in its simplest form includes a gear whose center revolves around the center of another gear. A typical planetary gear system includes at least four components, a sun gear, one or more planet gears, a carrier, and a ring gear. In these systems, the one or more planet gears may be mounted on the carrier, and the sun gear may be positioned at the center of the system so as to transmit torque to the one or more planet gears. The one or more planet gears may orbit around the sun gear and may mesh with the ring gear, which may surround both the sun gear and the one or more planet gears. In these systems, an input torque or force may be received by the sun gear and may be transmitted to the one or more planet gears from the sun gear. In some cases, the input power may be transmitted from the one or more plate gears to the ring gear.

Planetary gear systems may be used in many different applications. FIG. 1A shows an exemplary application of a planetary gear system. In particular, FIG. 1A show system 50 in which a planetary gear system 60 may be used in an aircraft system to transfer (and/or control the transfer of) power from gearbox input 54 to the rotor mast 52. As can be seen, in this example, planetary gear system 60 may be enclosed within gearbox casing 55, and may be configured to receive gearbox input 54 and transfer it to rotor mast 52. The configuration of planetary gear system 60 may include one or various possible configurations. For example, there are many different types of planetary gear systems, including single-stage planetary gear systems and multi-stage planetary gear systems.

FIG. 1B illustrates an example of a single-stage planetary gear system. In particular, planetary gear system 60 may include a single stage of power transmission. For example, planetary gear system 60 may include carrier 61 on which one or more planet gears 65 may be mounted. In this case, one or more planet gears 65 may be mounted on carrier 61 using one or more bearings 62, which may allow one or more bearings 62 to rotate with respect to carrier 61 while carrier 61 may remain fixed. As shown in the zoomed-in section, each of the one or more planet gears 65 may mesh with ring gear 61 on the outside face, and may mesh (e.g., on the inside face) with sun gear 66 positioned in the center of planetary gear system 60. In this manner, an input torque received by sun gear 66 may be transferred to one or more planet gears 65, and eventually to rotor mast 52. In this case, the transfer of torque may be in a single stage.

FIG. 1C illustrates an example of a multi-stage planetary gear system. In particular, FIG. 1C illustrates an example of two-stage planetary gear system 70, in which input power transmission may be performed in two stages, namely first stage 76 and second stage 75. In this example, an input power may be applied to a sun gear (not shown) of first stage 76, which may be meshed with one or more planet gears 72b of first stage 76. In this case, one or more planet gears 72b mounted on first stage carrier 71b may also mesh with first stage ring gear 73b. The input power applied to the sun gear of first stage 76 may be transferred to one or more planet gears 72b and may then be transferred to a sun gear (not shown) of second stage 75, which may be meshed with one or more planet gears 72a of second stage 75. In this case, one or more planet gears 72a mounted on second stage carrier 71a may also mesh with first stage ring gear 73a. The input power applied to the sun gear of second stage 75 may be eventually provided as an output of two-stage planetary gear system 70. As can be seen from this example, two-stage planetary gear system 70 may include two single-stage planetary gear systems connected in series. In this manner, the reduction ratio of a multi-stage planetary gear system may be multiplicative, where the reduction ratio is multiplied by the reduction ratio of the various stages.

A typical planetary gear system may be defined by a reduction ratio of the input speed to the output speed. For example, depending on the configuration of the planetary gear system (e.g., the size and/or number of gear teeth of the sun gear, the size, number, and/or number of gear teeth of the planet gears, etc.), the planetary gear system may reduce the speed of an input by a ratio of 3 to 1. The ratio may also depend on the type of planetary gear system, as mentioned above. However, as the ratio of a planetary gear system may depend on the size of the respective gears, in some applications in which space is limited, the reduction ratio of a planetary gear system may also be limited.

For example, in a particular aircraft application in which the main rotor gearbox size may be limited to a particular size, a single-stage planetary gear system may be limited to a maximum ratio due to the limits on the outer diameter of the main rotor gearbox. In this example, auxiliary drive speeds may also need to be maintained upstream from the planetary gear system section, in which case a two-stage planetary gear system may be limited to a minimum ratio, which may be larger than the maximum ratio to which the single-stage planetary gear system may be limited. As a consequence, in these applications in which operations may require an optimal reduction ratio between that lies between the maximum ratio to which the single-stage planetary gear system may be limited and the minimum ratio to which the two-stage planetary gear system may be limited, neither a single-stage planetary gear system nor a two-stage planetary gear system may be adequate, as this would fall under the sub-optimal range of the planetary gear systems.

In these cases, a compound planetary gear system may be used. Compound planetary gear systems may combine a single-stage planetary gear system and a multi-stage planetary gear system by using planet pinions, in which each planet pinion includes a main shaft with a P1 gear configured to mesh with the sun gear and a P2 gear configured to mesh with the ring gear. This allows for greater reduction ratios to be obtained while maintaining a smaller outside diameter. However, compound planetary gear systems may suffer from several disadvantages.

For example, due to the length of the planet pinions, typical compound planetary gear systems suffer from large axial loads being applied against the bearings of the carrier on which the planet pinions may be mounted. These axial forces may cause damage to and/or may shorten the life of the bearings. In addition, in typical compound planetary gear systems, large gear deflections may occur, which may affect the carrier. For example, stiffness and relative deflection between the upper and lower bearing journal bores of a carrier may be excessive in typical compound planetary gear systems. A typical solution is to strengthen the carrier by making the carrier heavier, but this increase in weight is not desirable, especially in aircraft applications.

Another disadvantage of typical compound planetary gear systems may include assembly. For example, assembling typical compound planetary gear systems may be complicated by the over hung and overlapping components. For example, positioning the ring gear over the upper bearing row of a typical compound planetary gear system may be very difficult, if not impossible, due to the size of upper bearings, which for a large reduction ratio may be a large size. At some ratios, the size of the upper bearing row may overlap the inner diameter of the ring gear making assembling the ring gear by sliding over the bearing row impossible.

Still another disadvantage of typical compound planetary gear systems may include that, due to a flexure installation (e.g., when a flexure ring gear is used), the heat flux of the ring gear may be too low, which in a loss of lube incident may be problematic. For example, when a loss of lubrication event occurs, the ability of a ring gear to "wick" away heat from the planetary system to the case of the gearbox is important. However, in a flexure ring gear (which may provide improved gear running dynamics), the thermal transfer potential of the ring gear is reduced significantly due to the flexure, which essentially creates a functional heat break.

SUMMARY

The present disclosure achieves technical advantages as systems and methods that provide an enhanced compound planetary gear system. The present disclosure provides for a system integrated into a practical application with meaningful limitations as a system with functionality that provides an enhanced and improved compound planetary gear system with functionality that addresses deficiencies of current compound planetary gear systems. In particular embodiments, a compound planetary gear system may be provided that includes at least one planet pinion including a main shaft having a first gear configured to mesh with a sun gear and a second gear configured to mesh with a ring gear, and a carrier configured to support the at least one planet pinion. In embodiments, the carrier may include an upper section and a lower section. The lower section may include one or more lower section bearings that may be configured to contact a first section of the at least one planet pinion proximate to the first gear, and the upper section may include one or more upper section bearings configured to contact a second section of the at least one planet pinion proximate to the second gear. In embodiments, the teeth of the first gear may be configured with a first helical angle with respect to a longitudinal angle of the at least one planet pinion, and the teeth of the second gear may be configured with a second helical angle with respect to the longitudinal angle of the at least one planet pinion. In embodiments, the first helical angle of the teeth of the first gear may be different from the second helical angle of the teeth of the second gear. In embodiments, the first helical angle and/or the second helical angle may be configured to balance the axial loads applied against the bearings (e.g., the lower section bearings and/or the upper section bearings) of the compound planetary gear system due to the torque of the input power transferred from the sun gear to the at least one planet pinion.

In alternative or additional embodiments, the carrier of a compound planetary gear system may include a multi-section or multi-piece carrier. For example, in some embodiments, the carrier of the compound planetary gear system may include a two-piece carrier including a lower section and an upper section. In embodiments, the lower section of the carrier may be configured to support (e.g., may be configured to contact) a lower portion of the at least one planet pinion on which the first gear (e.g., the first gear configured to mesh with the sun gear) is disposed, and the upper section of the carrier may be configured to support (e.g., may be configured to contact) an upper portion of the at least one planet pinion on which the second gear (e.g., the second gear configured to mesh with the ring gear) is disposed. In embodiments, the upper section and lower section of the carrier may facilitate and enhanced assembly process. In embodiments, the upper section and lower section of the carrier may be coupled to each other using a curvic coupling and a clamping force (e.g., using bolts, screws, etc.) through the curvic coupling. In embodiments, the multi-piece carrier configuration as disclosed herein may allow the use of different materials (e.g., different materials for each of the pieces of the carrier), which may provide that advantage of variable deflection properties for the carrier. In this case, the weight of the carrier may be reduced by using a material that allows for flexing in a section of the carrier expected to experience flexing forces, and in this manner the problems associated with deflection during operations may be addressed.

In alternative or additional embodiments, the multi-piece carrier configuration disclosed herein may allow for efficient deflection balancing between the upper and lower bearings of the carrier. For example, in embodiments, the spline to the output of the compound planetary gear system may be placed inline with the bearing (e.g., lower or upper) experiencing a higher axial load. In some embodiments, a torsional flexure may also be provided in the upper section of the carrier. In this manner, the bearing bores in the upper section of the carrier may be compliant and may deflect proportionally with any deflection in the lower section of the carrier. These embodiments may provide the advantage of reduced carrier weight when compared to typical systems (e.g., which may add material to stiffen or strengthen the carrier to reduce relative deflections), which may be a significant advantage, especially in aircraft applications.

In alternative or additional embodiments, the bearing bores in the upper bearing row of the carrier may be implemented as split bearing bores in accordance with embodiments of the present disclosure. For example, in embodiments, each of the split bearing bores in the upper bearing row of the carrier may include a removable section that may be removed during installation of the ring gear of the compound planetary gear system. Removing the removable section of a split bearing bore may allow removal of the bearing and may provide clearance to slide the ring gear over the upper section of the carrier. After the ring gear has been slid over the upper section of the carrier, the removable section may be installed to ensure that the bearing remains in place within the bearing bore. The advantage provided by the split bearing bore of embodiments may include the use or larger bearings that may otherwise not be possible due to the difficulty of installing the ring gear over large bearings. In embodiments, nut-stop brackets may be implemented to secure the removable section after installation to prevent the fastener used to secure the removable section to the split bearing bore from coming loose and damaging the system.

In alternative or additional embodiments, such as when a flexure is added to the ring gear of the compound planetary gear system, a flexible high temperature seal (e.g., silicone and/or other suitable high temperature material) may be disposed within a portion of the flexure of the ring gear, to create a dam for oil to accumulate behind the ring gear, thermally coupling (e.g., via the oil) the ring gear to the casing of the compound planetary gear system, which may increase the thermal conductivity between the ring gear and the casing. In this manner, the heat transfer provided by the flexure ring gear may be improved, which may address the problems with limited heat transfer (e.g., during a loss of lubrication event) present in typical systems due to the flexure.

It is an object of the disclosure to provide a compound planetary gear system. It is a further object of the disclosure to provide a method of manufacturing a compound planetary gear system. These and other objects are provided by the present disclosure, including at least the following embodiments.

In one particular embodiment, a compound planetary gear system is provided. The compound planetary gear system includes at least one planet pinion including a main shaft having a first gear configured to mesh with a sun gear and a second gear configured to mesh with a ring gear, and a carrier configured to support the at least one planet pinion. In embodiments, the carrier may include an upper section and a lower section. In embodiments, the lower section includes one or more lower section bearings configured to contact a first section of the at least one planet pinion proximate to the first gear, and the upper section includes one or more upper section bearings configured to contact a second section of the at least one planet pinion proximate to the second gear. In embodiments, teeth of the first gear are configured with a first helical angle with respect to a longitudinal angle of the at least one planet pinion, teeth of the second gear are configured with a second helical angle with respect to the longitudinal angle of the at least one planet pinion, and the first helical angle of the teeth of the first gear is different from the second helical angle of the teeth of the second gear.

In another embodiment, a method of manufacturing a compound planetary gear system is provided. The method includes disposing a first gear configured to mesh with a sun gear and a second gear configured to mesh with a ring gear on a main shaft of at least one planet pinion, and configuring a carrier to support the at least one planet pinion. In embodiments, configuring the carrier includes including an upper section and a lower section. In embodiments, the lower section includes one or more lower section bearings configured to contact a first section of the at least one planet pinion proximate to the first gear, and the upper section includes one or more upper section bearings configured to contact a second section of the at least one planet pinion proximate to the second gear. In embodiments, teeth of the first gear are configured with a first helical angle with respect to a longitudinal angle of the at least one planet pinion, teeth of the second gear are configured with a second helical angle with respect to the longitudinal angle of the at least one planet pinion, and the first helical angle of the teeth of the first gear is different from the second helical angle of the teeth of the second gear.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to an enhanced compound planetary gear system. In particular, the present disclosure provides for a compound planetary gear system with functionality that addresses deficiencies of current compound planetary gear systems.

Figure 1A:
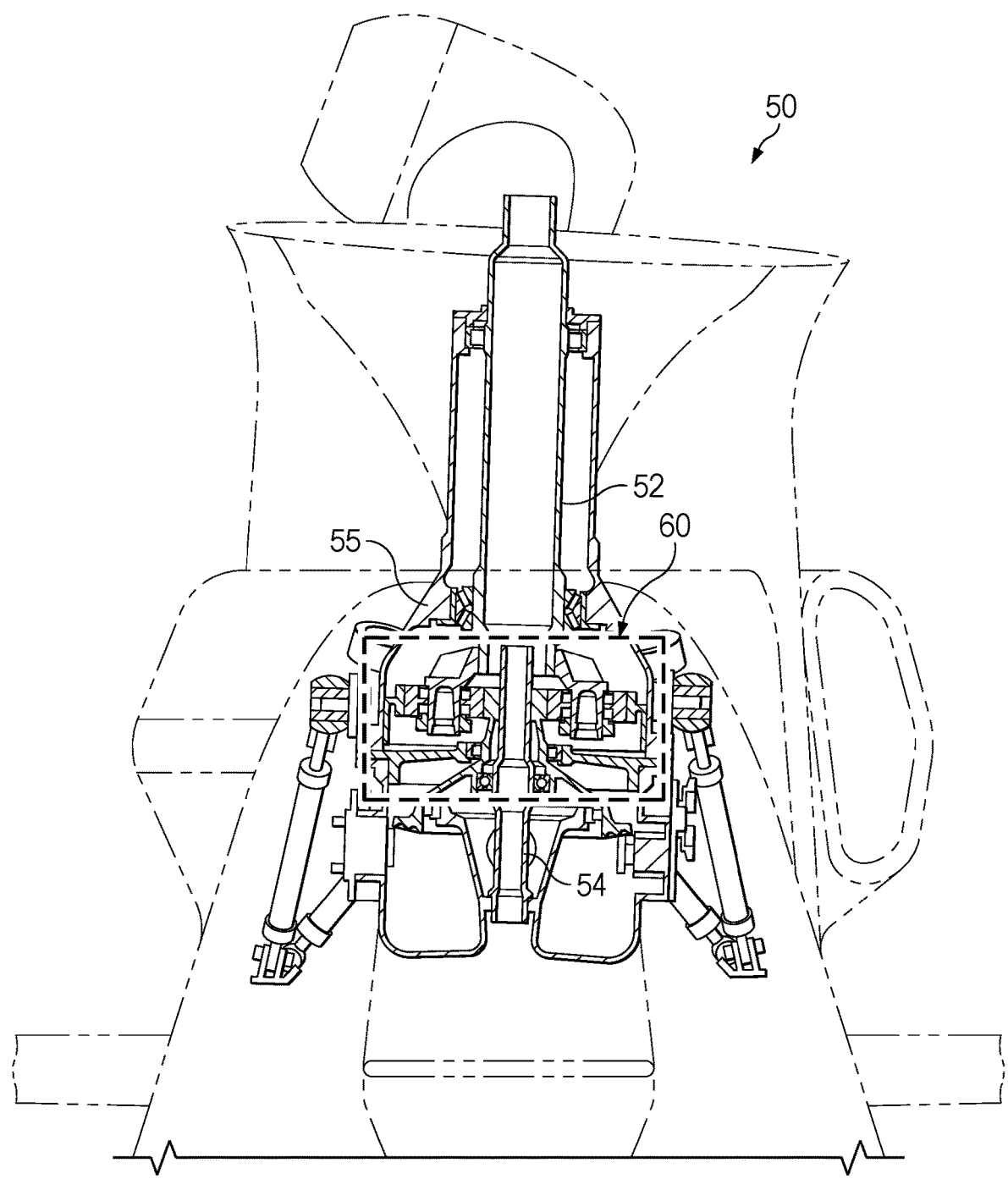
FIG. 1A shows an exemplary application of a planetary gear system.
Figure 1B:
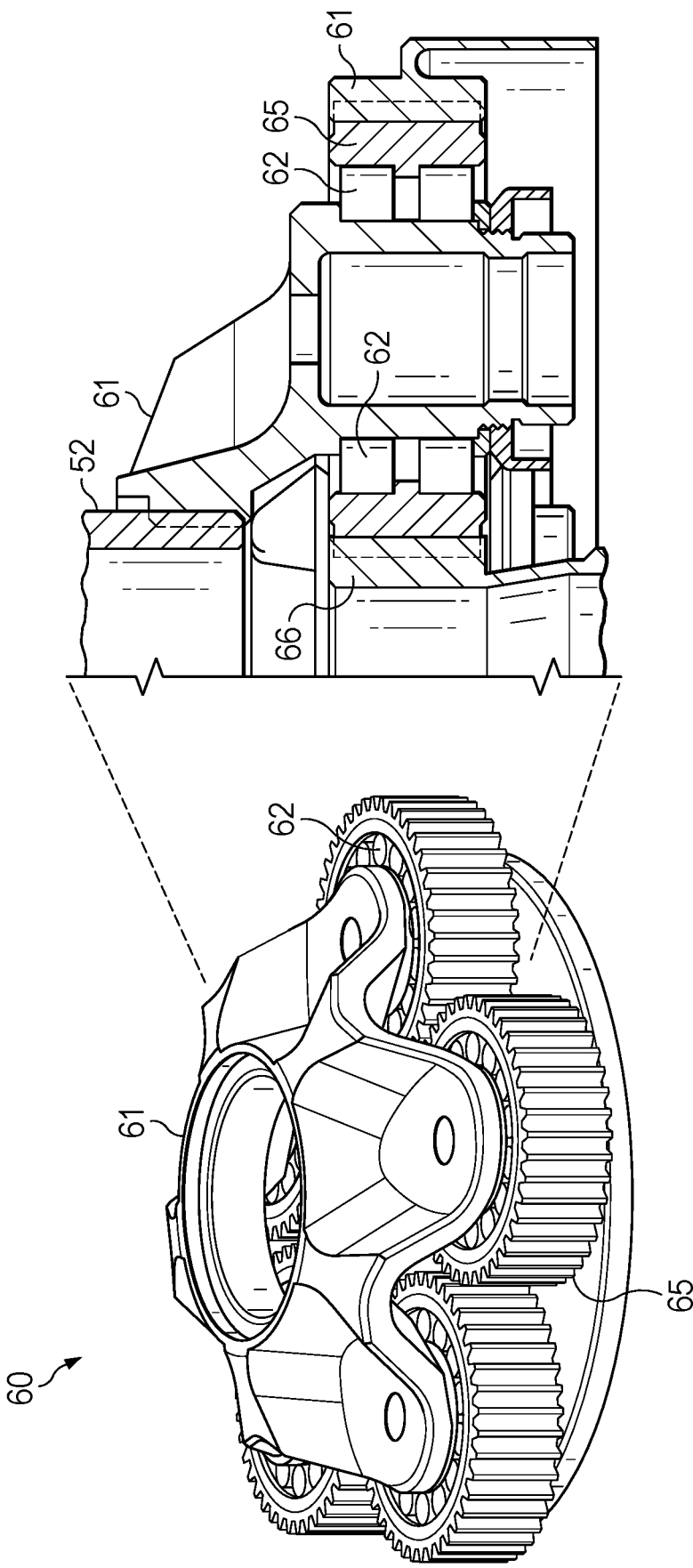
FIG. 1B illustrates an example of a single-stage planetary gear system.
Figure 1C:
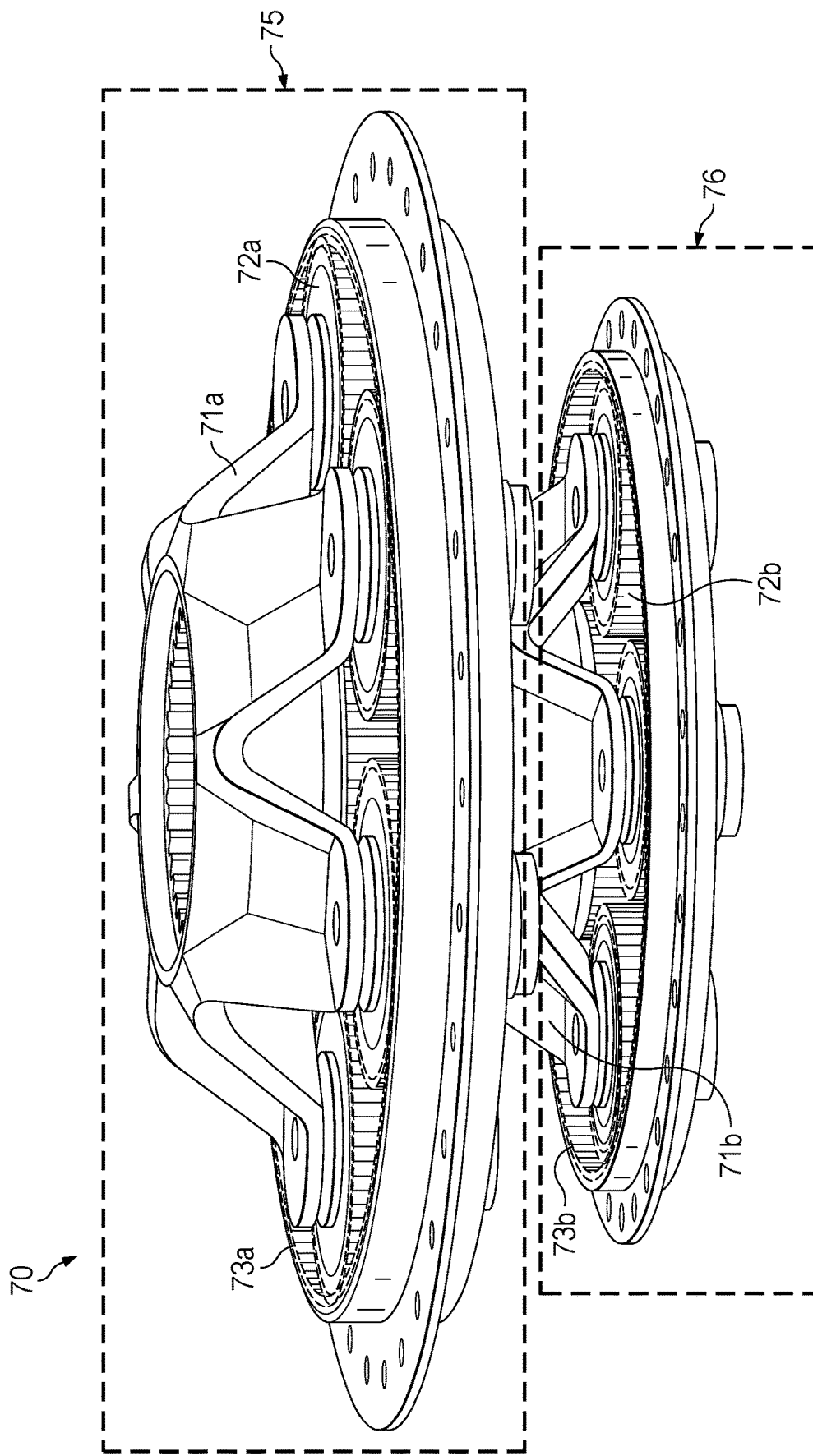
FIG. 1C illustrates an example of a multi-stage planetary gear system.
Figure 2A:
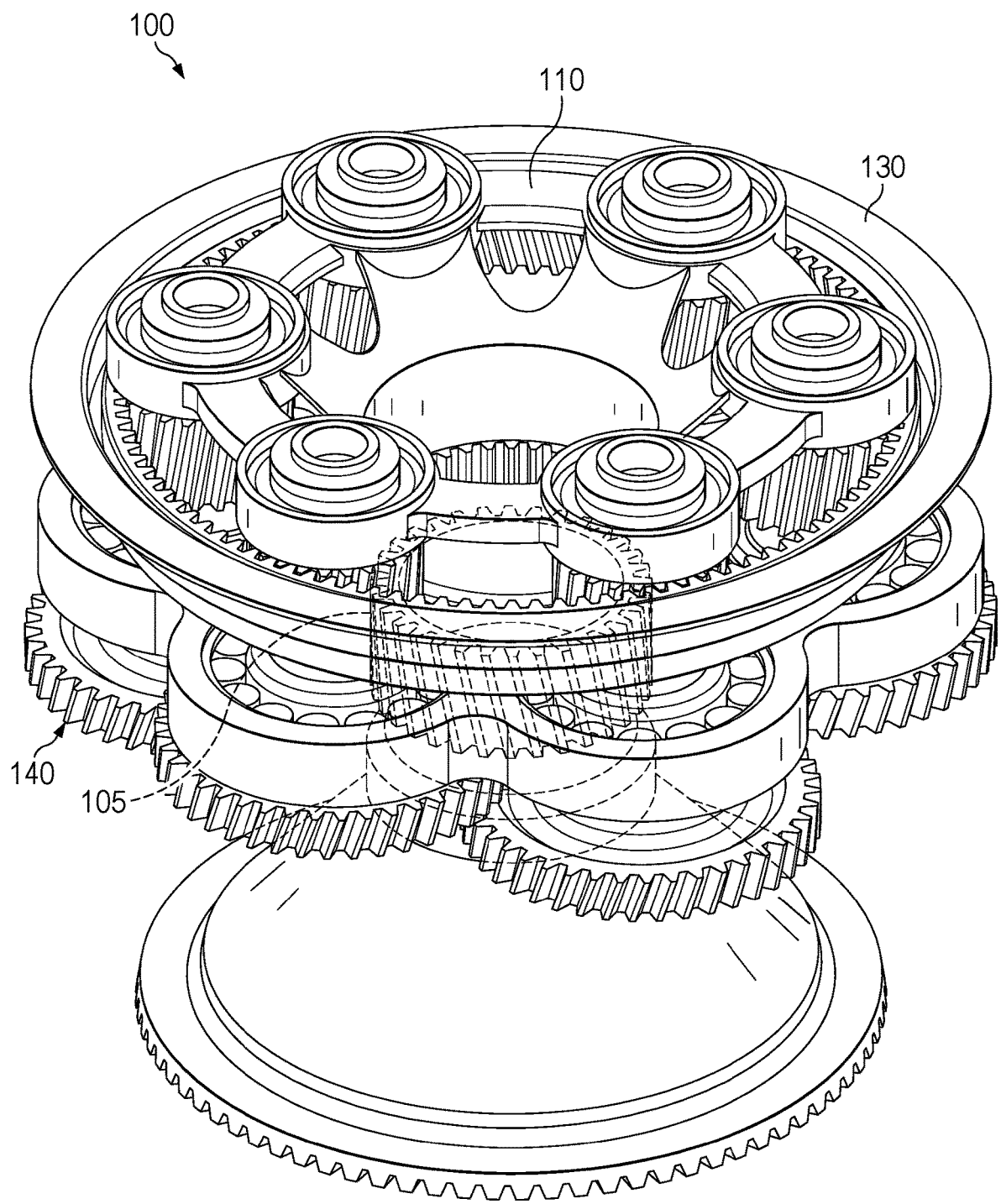
FIG. 2A is a diagram of an exemplary compound planetary gear system configured with capabilities and functionality in accordance with embodiments of the present disclosure.

FIG. 2A is a diagram of an exemplary compound planetary gear system 100 configured with capabilities and functionality in accordance with embodiments of the present disclosure. As shown in FIG. 2A, compound planetary gear 200 may include carrier 110, ring gear 130, one or more planet pinions 140, and sun gear 105. As shown, sun gear 105 may be disposed approximately in the center of compound planetary gear system 100. In embodiments, one or more planet pinions 140, may be disposed around sun gear 105. In embodiments, each of the one or more planet pinions 140 may be mounted on carrier 110 in such a manner as to allow each of the one or more planet pinions 140 to rotate with respect to carrier 110. In embodiments, each of the one or more planet pinions 140 may be configured to mesh (e.g., using a corresponding gear of each of the one or more planet pinions 140) with sun gear 105 and to concurrently mesh (e.g., using a corresponding gear of each of the one or more planet pinions 140) with ring gear 130. During operations, sun gear 104 may receive an input (e.g., a rotational input) having a particular torque and speed, which may cause sun gear 105 to rotate about its longitudinal axis. The rotation of sun gear 105 may cause one or more planet pinions 140 to rotate against ring gear 130, causing carrier 110 to rotate. In embodiments, carrier 110 may be coupled to an output (e.g., rotor mast 52) to which the output rotation is provided. In embodiments, the torque and/or speed of the output rotation may depend on the configuration of compound planetary gear system 100. In this manner, compound planetary gear system 100 may operate to transfer the input power (e.g., the input rotation of particular torque and speed) to an output that may be used to drive a component (e.g., rotor mast 52 used to drive a propeller of an aircraft).

Figure 2B:
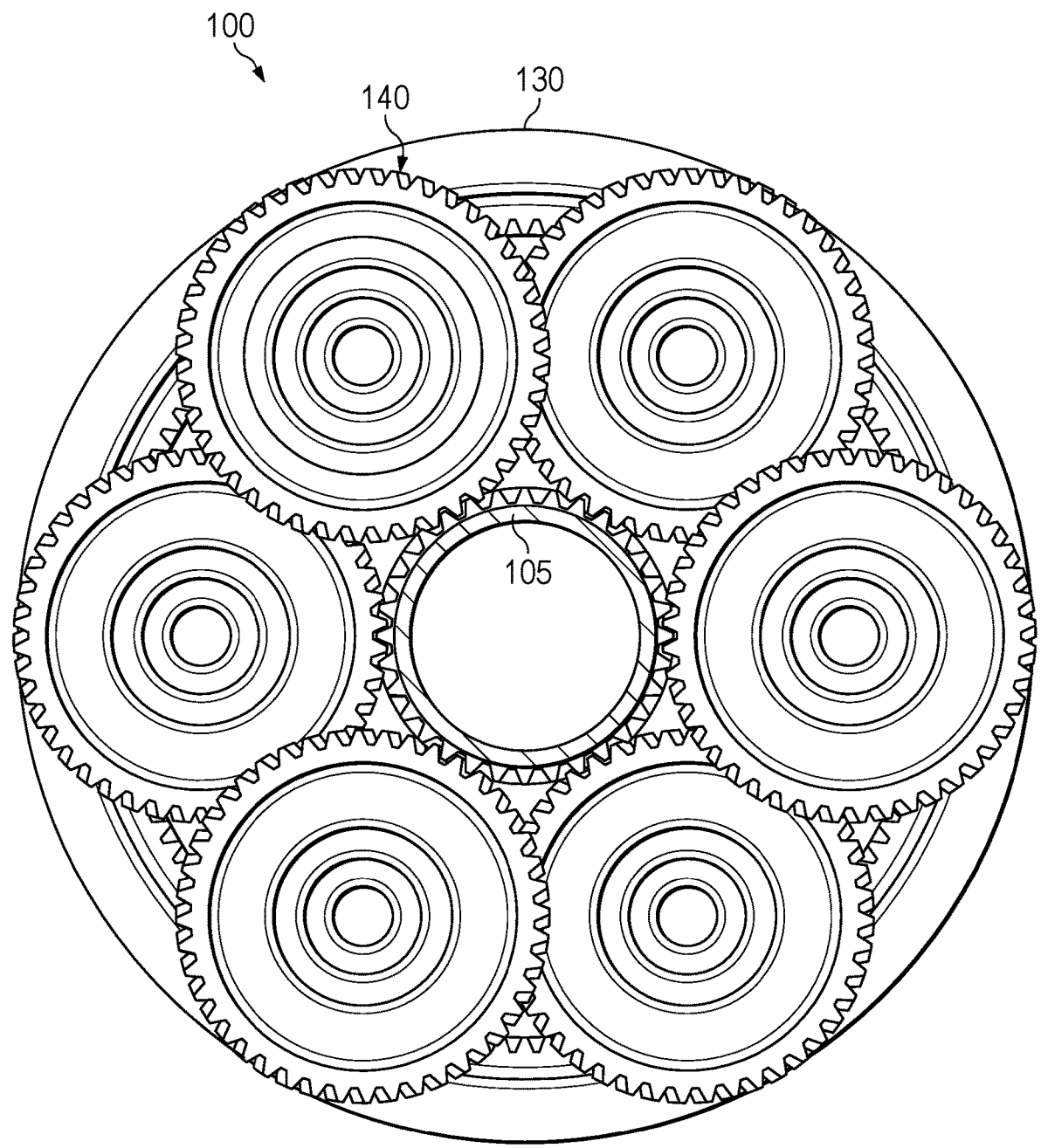
FIGS. 2B and 2C show diagrams illustrating an example layout of a compound planetary gear system in accordance with embodiments of the present disclosure.
Figure 2C:
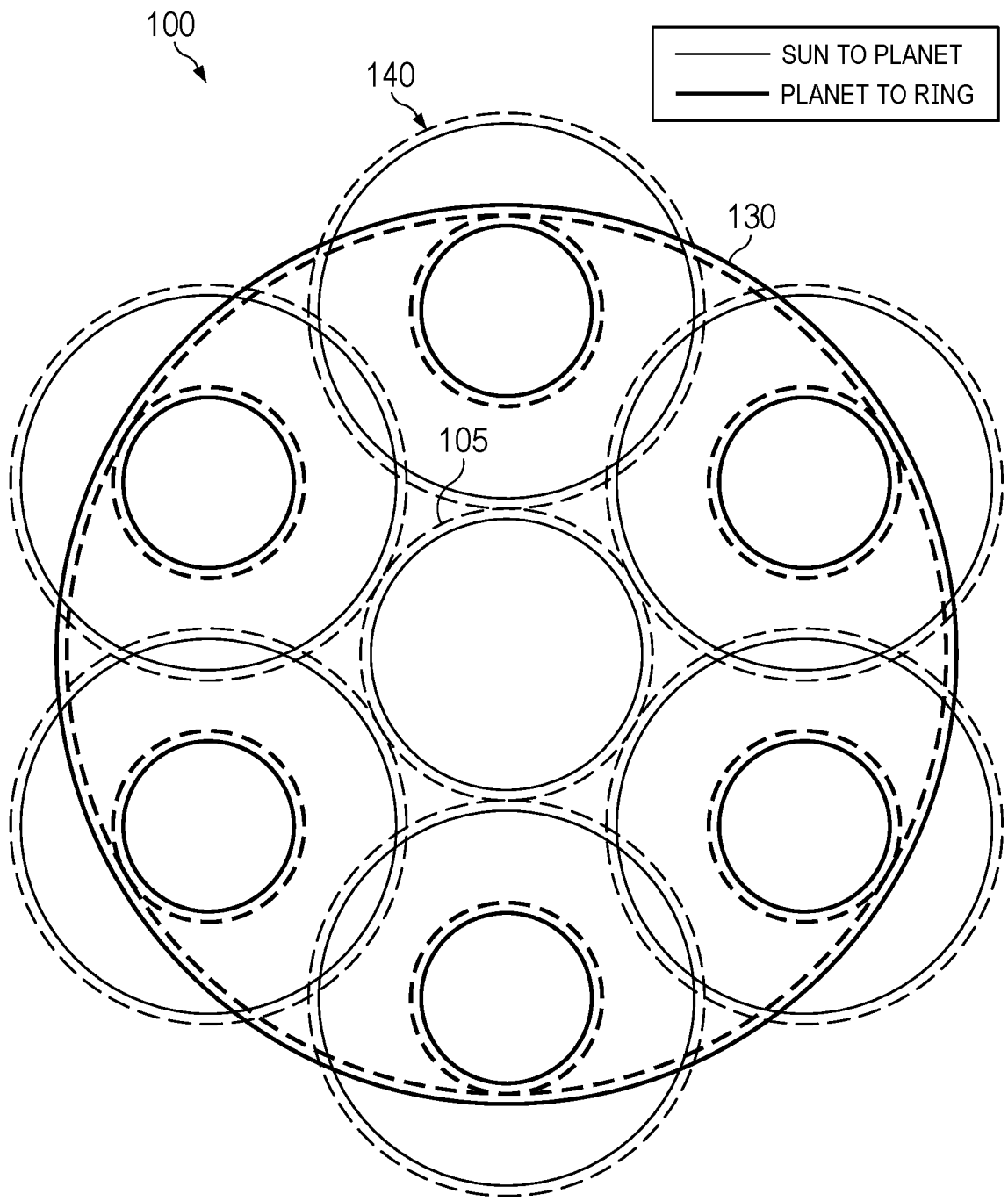

FIGS. 2B and 2C show diagrams illustrating an example layout of a compound planetary gear system 100 in accordance with embodiments of the present disclosure. In particular, as shown, one or more planet pinions 140, which in the example illustrated in FIGS. 2B and 2C includes six planet pinions 140, may be disposed around sun gear 105. In embodiments, ring gear 130 may surround all of the one or more planet pinions 140. As shown in FIG. 2B, each of one or more planet pinions 140 may mesh with sun gear 105 and, as shown in FIG. 2C, and with gear ring 130 (e.g., the interior face of gear ring 130).

In this example, the six planet pinions 140 may be positioned so as to overlap one another (described in more detail below). This allows the diameter of compound planetary gear system 100 to be reduced, as without the overlap the spacing between one or more planet pinions 140 may be larger, thereby increasing the overall diameter of compound planetary gear system 100. The planet pinions overlapping functionality of compound planetary gear system 100 may allow the diameter of ring gear 130 to be reduced as well, as the planet pinions 140 may be positioned closed together.

In embodiments, compound planetary gear system 100 may be configured with functionality to address deficiencies of typical compound planetary gear systems. For example, as noted above, typical compound planetary gear systems may suffer from lower bearing operating life due to excessive and/or unbalanced axial forces operating in the compound planetary gear systems during operations. In many cases, this disadvantage of typical compound planetary gear systems affects the benefits of using a compound planetary gear system, which may provide a greater reduction ratio than a single-stage planetary gear systems for the same diameter of the system.

In embodiments, compound planetary gear system 100 may include functionality for balancing the load experienced by compound planetary gear system 100. In embodiments, the functionality for balancing the load experienced by compound planetary gear system 100 may include configuring the one or more planet pinions 140 with gears having different helical angles. The functionality for balancing the load experienced by compound planetary gear system 100 in accordance with embodiments of the present disclosure will now be discussed with respect to FIGS. 2D-2G.

Figure 2D:
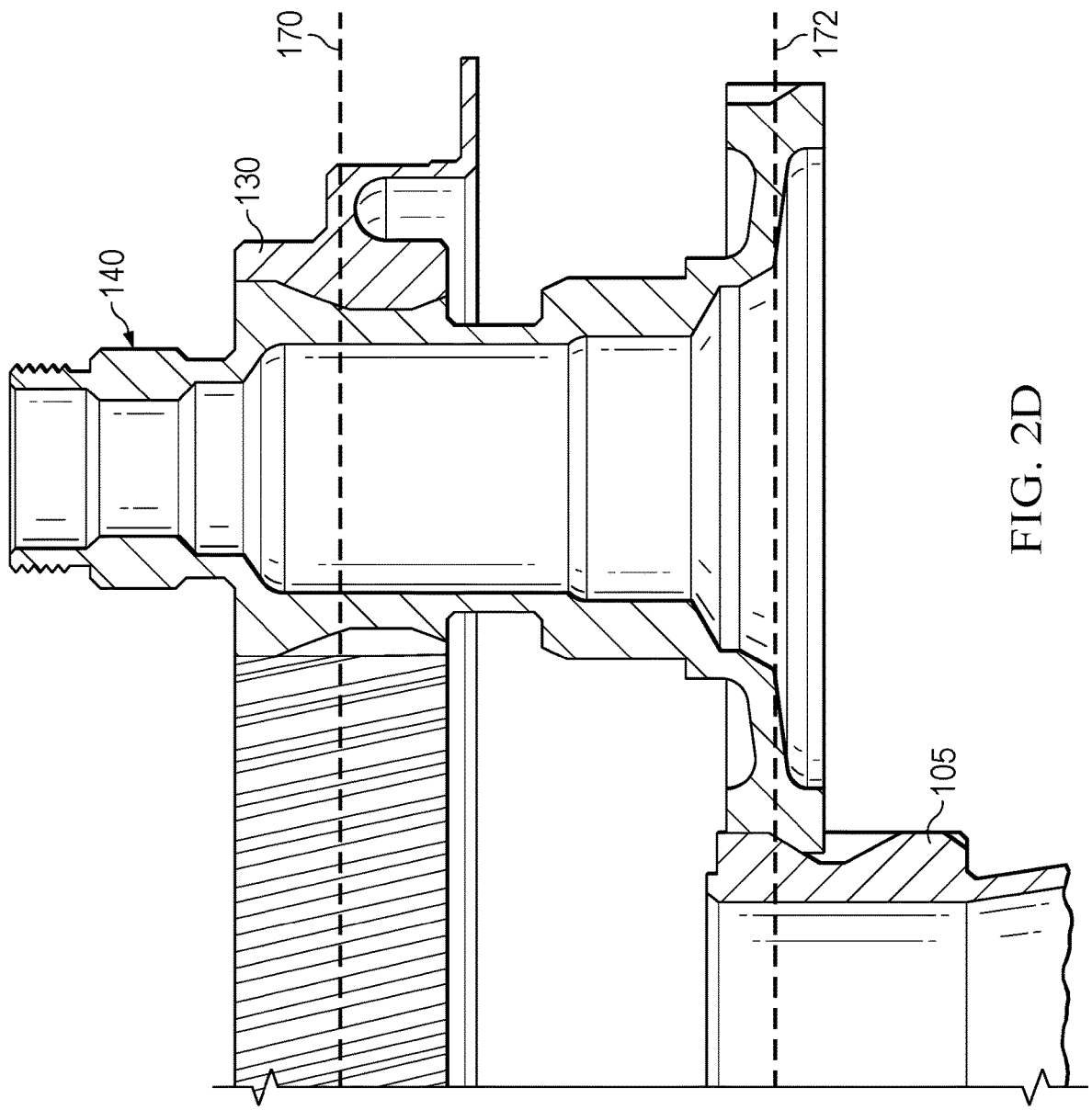
FIGS. 2D-2G show diagrams illustrating functionality for balancing loads experienced by components of compound planetary gear system in accordance with embodiments of the present disclosure.
Figure 2D:
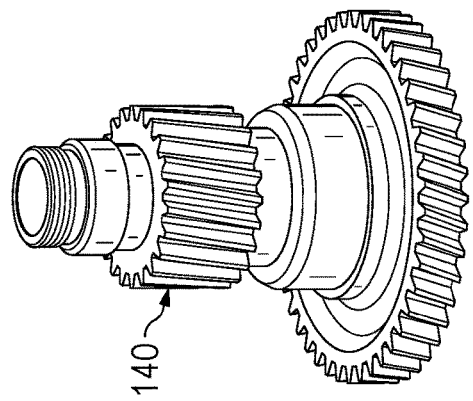
Figure 2E:
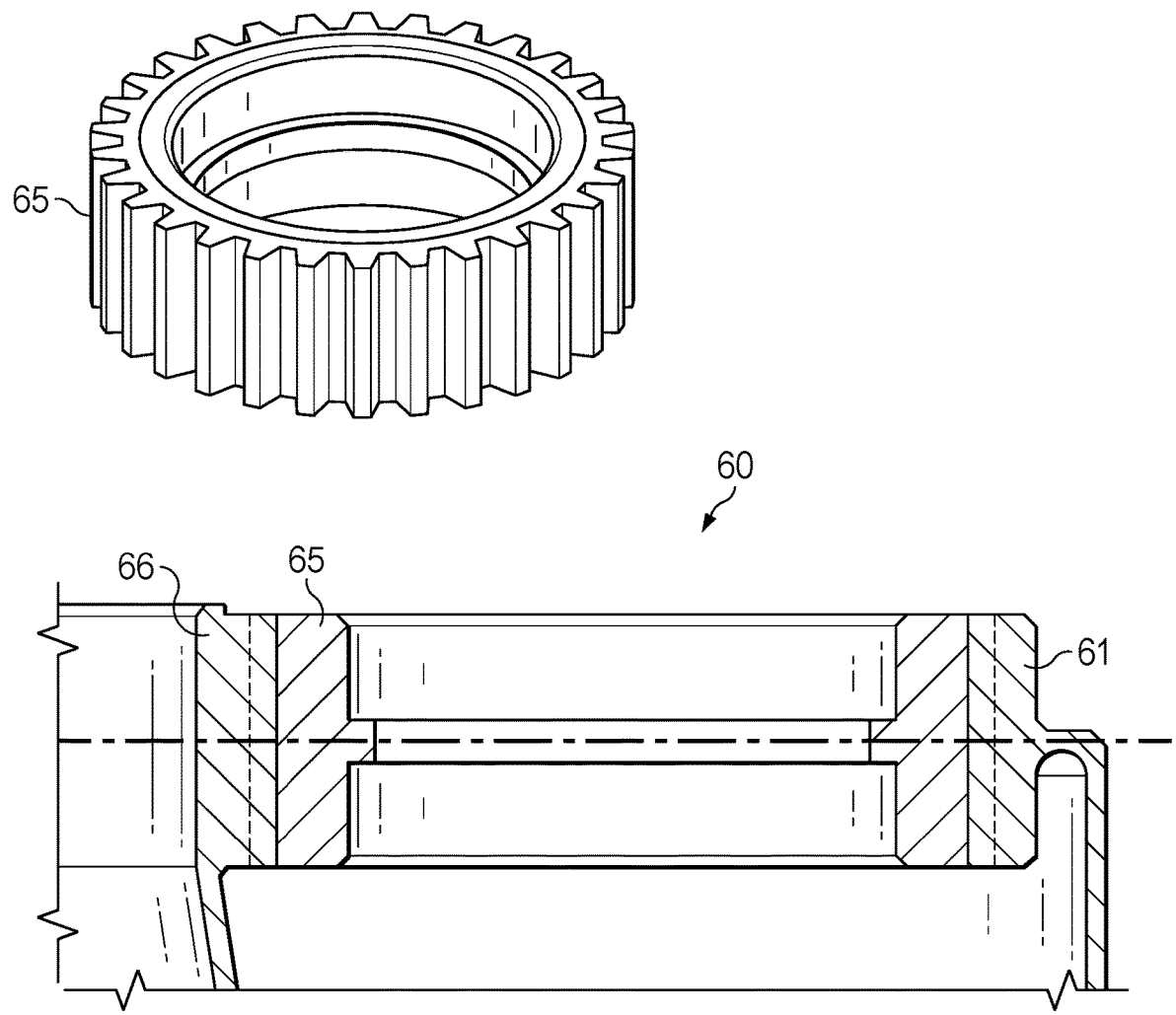
Figure 2F:
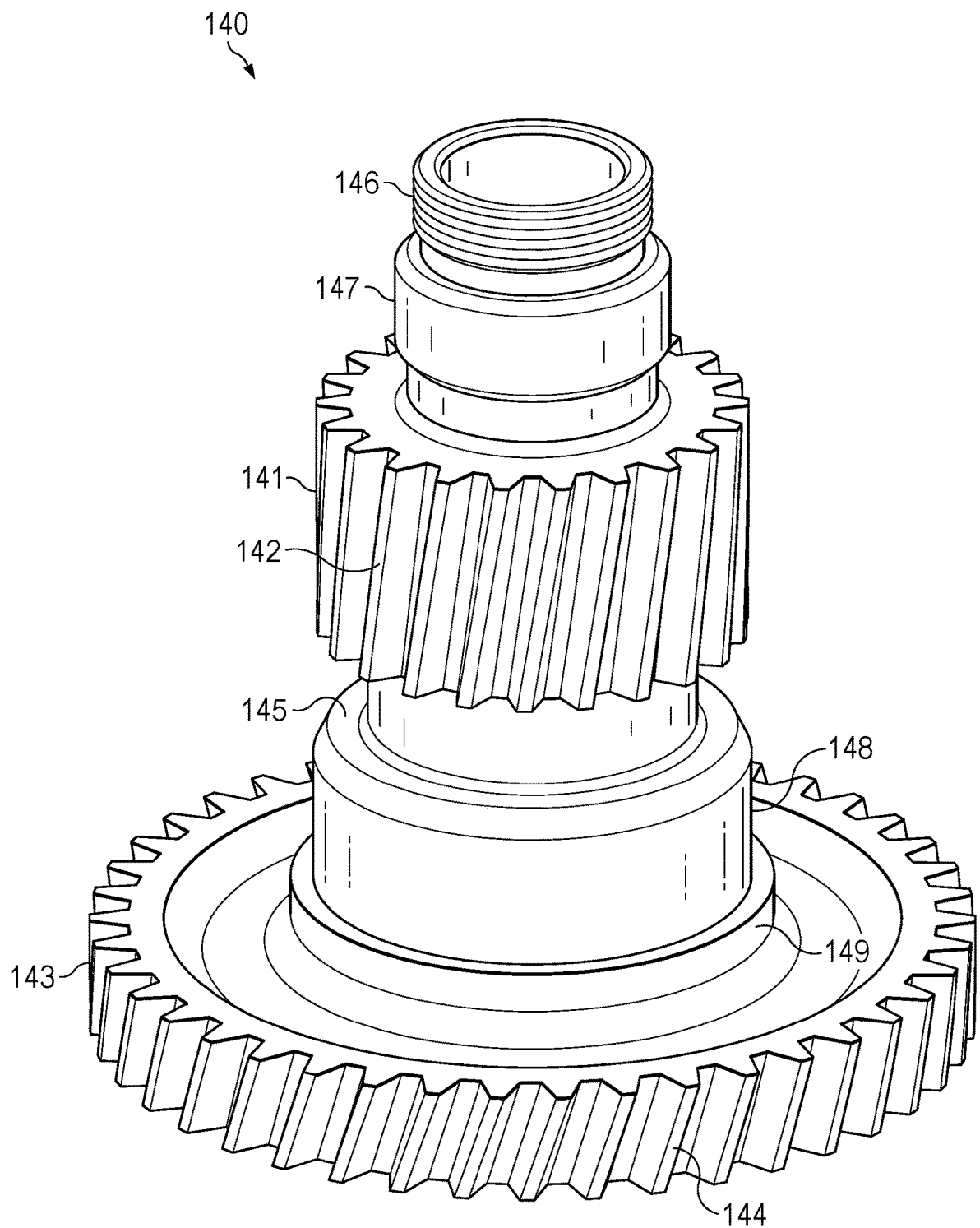

FIG. 2F shows an example a diagram illustrating a planet pinion 140 configured in accordance with embodiments of the present disclosure. In particular, as shown in FIG. 2F, planet pinion 140 may include main shaft 145 having upper section 146 and lower section 149.

In embodiments, lower section 149 of planet pinion 140 may include lower bearing raceway 148 and lower gear 143 disposed along main shaft 145 and axially separated from upper gear 141. In embodiments, lower bearing raceway 148 may be configured to rotatably contact or abut with a bearing included in a bearing bore of carrier 110 of compound planetary gear system 100. In this manner, the bearing may allow lower end 149 of planet pinion 140 to rotate within the bearing bore with respect to carrier 110. In embodiments, lower gear 143 may be configured to mesh with sun gear 105 of compound planetary gear system 100. In this manner, planet pinion 140 may receive, using lower gear 143, a rotational force from sun gear 105, causing planet pinion 140 to rotate about its longitudinal axis.

In embodiments, upper section 146 of planet pinion 140 may include upper bearing raceway 147 and upper gear 141 disposed along main shaft 145 and axially separated from lower gear 143. In embodiments, upper bearing raceway 147 may be configured to rotatably contact or abut with a bearing included in a bearing bore of carrier 110 of compound planetary gear system 100. In this manner, the bearing may allow planet pinion 140 to rotate within the bearing bore with respect to carrier 110. In embodiments, upper gear 141 may be configured to mesh with ring gear 130 of compound planetary gear system 100. In this manner, as planet pinion 140 rotates in response to receiving a rotational force from sun gear 105, the rotational force may be transferred, using upper gear 141, to ring gear 130.

Figure 2G:
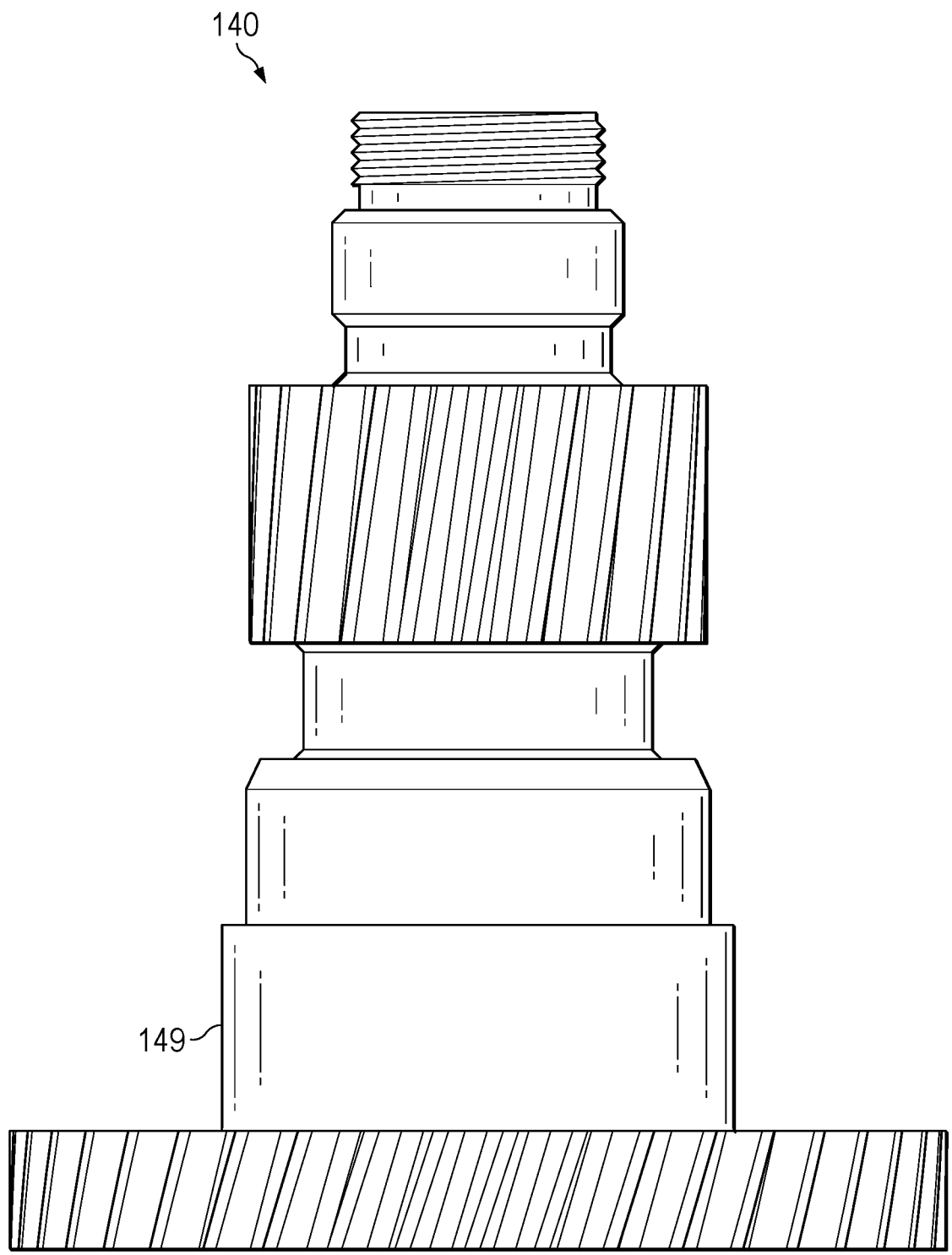

In some embodiments, planet pinion 140 may include different configurations, such as length. For example, in some embodiments, such as when one or more planet pinions 140 may be positioned so as to overlap one another, alternating planet pinions may have different lengths to ensure that the lower gear of a first planet pinion 140 does not lie along the same plane as the lower gear of an adjacent planet pinion 140. For example, in embodiments as shown in FIG. 2G, lower end 149 of planet pinion 140 may have a longer length than lower end 149 of planet pinion 140 as shown in FIG. 2F. In this manner, when positioned within carrier 110 and against sun gear 105, the lower gear of planet pinion 140 of FIG. 2F may mesh with sun gear 105 at a point axially higher than the point at which the lower gear of planet pinion 140 of FIG. 2G may mesh with sun gear 105, thereby allowing the planet pinions to be overlapped.

FIG. 2D shows a diagram illustrating a planet pinion 140 of a compound planetary gear system 100 during operation in accordance with embodiments of the present disclosure. FIG. 2D shows a diagram illustrating a planet pinion 60 of a single-stage planetary gear system.

As can be seen in FIG. 2E, the line of action of a single-stage planetary gear system may be disposed along a single plane, as the sun gear and the ring gear are disposed along a same plane (or at least overlap the same plane). In this example, the reduction ratio of the single-stage planetary gear system may be a function of the ratio of the number of teeth of sun gear 66 to the number of teeth of ring gear 61. In this single-stage planetary gear system, the planet pinion 65 may be functionally an idler with respect to calculation of the reduction ratio, as the configuration of planet pinion 65 does not contribute to ratio reduction. It is noted that in a single-stage planetary gear system, planet pinion to planet pinion tip clearance is one of the major factors limiting the reduction ratio possible from a single-stage planetary gear system.

In contrast to FIG. 2E, the line of action for compound planetary gear system 100, as shown in FIG. 2D, may be compounded in two planes. For example, in compound planetary gear system 100, ring gear 130 may be disposed along plane 170, and sun gear 105 may be disposed along plane 172. In this example, planet pinion 140 (and each of the one or more planet pinions 140 of compound planetary gear system 100) may be configured to mesh with ring gear 170 along plane 170, and to mesh with sun gear 105 along plane 172. In this manner, the rotational force provided by sun gear 105 against planet pinion 140 may be transferred against ring gear 130 from plane 172 to plane 170. In this manner, the line of action for compound planetary gear system 100 may be compounded in two planes 170 and 172. It is noted that in this example, the reduction ratio of compound planetary gear system 100 may be a function of the sun gear 105 to planet pinon 140 ratio and planet pinion 140 to ring gear 130 ratio. In this manner, in compound planetary gear system 100, planet pinion 140 (and each of the one or more planet pinions 140 of compound planetary gear system 100) may contribute to the overall reduction ratio of compound planetary gear system 100.

In embodiments, during operation of compound planetary gear system 100, the rotational force provided by sun gear 105 against planet pinion 140 may have a torque, which may be applied against lower gear 143 of planet pinion 140 along plane 172. The same torque, however, may be experienced by upper gear 141 of planet pinion 140 along plane 170. In this case, the tangential load experienced at the teeth of a gear (e.g., the lower gear and/or the upper gear) may depend on the torque applied and the diameter of the gear. For example, given a same torque, lower gear 143, having a larger diameter than the diameter of upper gear 141, may experience a lesser tangential load than the load experienced by upper gear 141. This difference in the tangential load at the gears of planet pinion 140 may cause the axial loads along the axis of planet pinion 140 to be unbalanced. As such, the load experienced by a bearing supporting upper bearing raceway 147 and by a bearing supporting lower bearing raceway 148 may not be balanced and one may be higher than the other. In this case, the bearing experiencing higher loads may suffer from a shorter life, as the higher loads may cause more strain on the bearing.

In embodiments, as shown in FIG. 2F, planet pinion 140 may be configured with different helical angles. For example, upper gear 141 of planet pinion 140 may be configured as a helical gear having a first helical angle 142 and lower gear 143 of planet pinion 140 may be configured as a helical gear having a second helical angle 144 different from first helical angle 142. In embodiments, a helical angle of a helical gear may include the angle of the helix used in the helical gear. In embodiments, the teeth of upper gear 141 and lower gear 143 may have the same helical direction or the same hand teeth. For example, in some embodiments, the teeth of upper gear 141 and the teeth of lower gear 143 may be right-handed teeth, or may be left-handed teeth.

In embodiments, the helical angles of upper gear 141 and lower gear 143 may be configured to balance the axial loads resulting from the loads applied at the upper gear 141 and lower gear 143. In embodiments, the helical angles of upper gear 141 and lower gear 143 may be configured to balance the axial loads experienced by the bearing supporting upper bearing raceway 147 and by the bearing supporting lower bearing raceway 148. In embodiments, the helical angles of upper gear 141 and lower gear 143 may be such that the axial loads are zeroed out, which may eliminate or minimize the load experienced by the bearings.

For example, without a helical angle, bearings supporting upper bearing raceway 147 and/or lower bearing raceway 148 may react to the moment created by radial gear loads resulting from rotation of planet pinion 140. For example, upper gear 141 may apply a gear load against the bearings supporting upper bearing raceway 147 and lower gear 143 may apply a gear load against the bearings supporting lower bearing raceway 148. These gear loads may create an in-plane moment within planet pinion 140. In particular, the magnitude and direction of the radial load experienced by the bearings supporting upper bearing raceway 147 and/or lower bearing raceway 148 may depend on the moment created within planet pinion 140. For example, in an example, without a helical angle, the bearings supporting upper bearing raceway 147 may experience a significantly larger radial force than the bearings supporting lower bearing raceway 148.

In embodiments, a helical angle applied to one or more of the upper gear 141 and lower gear 143 may induce an axial load within planet pinion 140. In embodiments, the direction and/or handedness of the helical angle may be selected such as to ensure that axial loads experienced by planet pinion 140 are in opposition to the moment created by the radial loads experienced by the bearings supporting upper bearing raceway 147 and/or lower bearing raceway 148. In this case, the helical angle applied to one or more of the upper gear 141 and lower gear 143 may be selected such as to balance the reaction loads equally (or substantially equally) between the bearings supporting upper bearing raceway 147 and the bearings supporting lower bearing raceway 148. In this case, following the example above, with a helical angle, the radial force experienced by the bearings supporting upper bearing raceway 147 may be significantly reduced (e.g., when compared to the example above with no helical angle). In this case, the radial force may be exerted into the carrier (e.g., which may have a greater structural strength) rather than into the bearings.

In some embodiments, rather than balancing the radial loads (e.g., reaction loads) equally (or substantially equally) between the bearings supporting upper bearing raceway 147 and the bearings supporting lower bearing raceway 148, the helical angle for one or more of lower gear 143 and/or upper gear 141 may be selected to eliminate radial loads from one of bearings (e.g., from one or more of the bearings supporting upper bearing raceway 147 and/or lower bearing raceway 148). For example, the helical angle applied to one or more of the upper gear 141 and lower gear 143 may be selected such that the radial loads experienced by the bearings supporting upper bearing raceway 147 or the radial loads experienced by the bearings supporting lower bearing raceway 148 are eliminated.

In embodiments, determining the different helical angles of upper gear 141 and lower gear 143 may be based on the difference on the loads experienced at the upper gear 141 and lower gear 143. In some embodiments, the helical angle difference between the helical angle of upper gear 141 and the helical angle of lower gear 143 may be based on the load difference between the load experienced by upper gear 141 and the load experienced by lower gear 143. For example, in the example illustrated in FIG. 2F, and merely for illustrative purposes, lower gear 143 may have a diameter that is twice the diameter of upper gear 141. In this example, given the specific differences in the diameters of upper gear 141 and lower gear 143, and given an input rotational force (e.g., from sun gear 105) of a given torque, lower gear 143 may experience a tangential load that is half of the tangential load experienced by upper gear 141. In this example, helical angle 142 of upper gear 141 and helical angle 144 of lower gear 143 may be configured such that that the tangent of helical angle 142 is twice as large as the tangent of helical angle 144.

In embodiments, the helical angles of upper gear 141 and lower gear 143 may be configured to balance one or more of the axial loads, radial loads, and/or bearing loads generated by the rotation of the planet pinion 140. For example, the axial load for a helical gear may be defined by Equation 1 below.

$$F_a = \frac{2T}{D_p} \tan \psi \qquad \text{Equation 1}$$

where T is the torque carried by the helical gear, $D_p$ is the pitch diameter of the helical gear, and $\psi$ is the helix angle.

In embodiments, balancing the axial loads experienced by an upper gear (e.g., upper gear 141) and lower gear (e.g., lower gear 143) of a compound planet pinion a (e.g., planet pinion 140) may include setting $F_{a,upper}=F_{a,lower}$, where $F_{a,upper}$ may be the axial load experienced by upper gear 141 of planet pinion 140, and $F_{a,lower}$ may be the axial load experienced by lower gear 143 of planet pinion 140. In this case, the pitch diameter and/or the helix angle of upper gear 141 and/or lower gear 143 may be varied to ensure that $F_{a,upper}=F_{a,lower}$ and that the torque experienced at upper gear 141 and/or lower gear 143 may be the same. In this manner, the carrier loads at helical gears may be balanced such that no external support may be needed.

In embodiments, the loads generated by the helical gears (e.g., upper gear 141 and/or lower gear 143) may act upon the bearings supporting the planet pinion. In embodiments, balancing the loads generated by the rotation of the planet pinion against the bearings may include balancing the radial loads and the axial loads generated by the rotation of the planet pinion in combination.

Figure 3A:
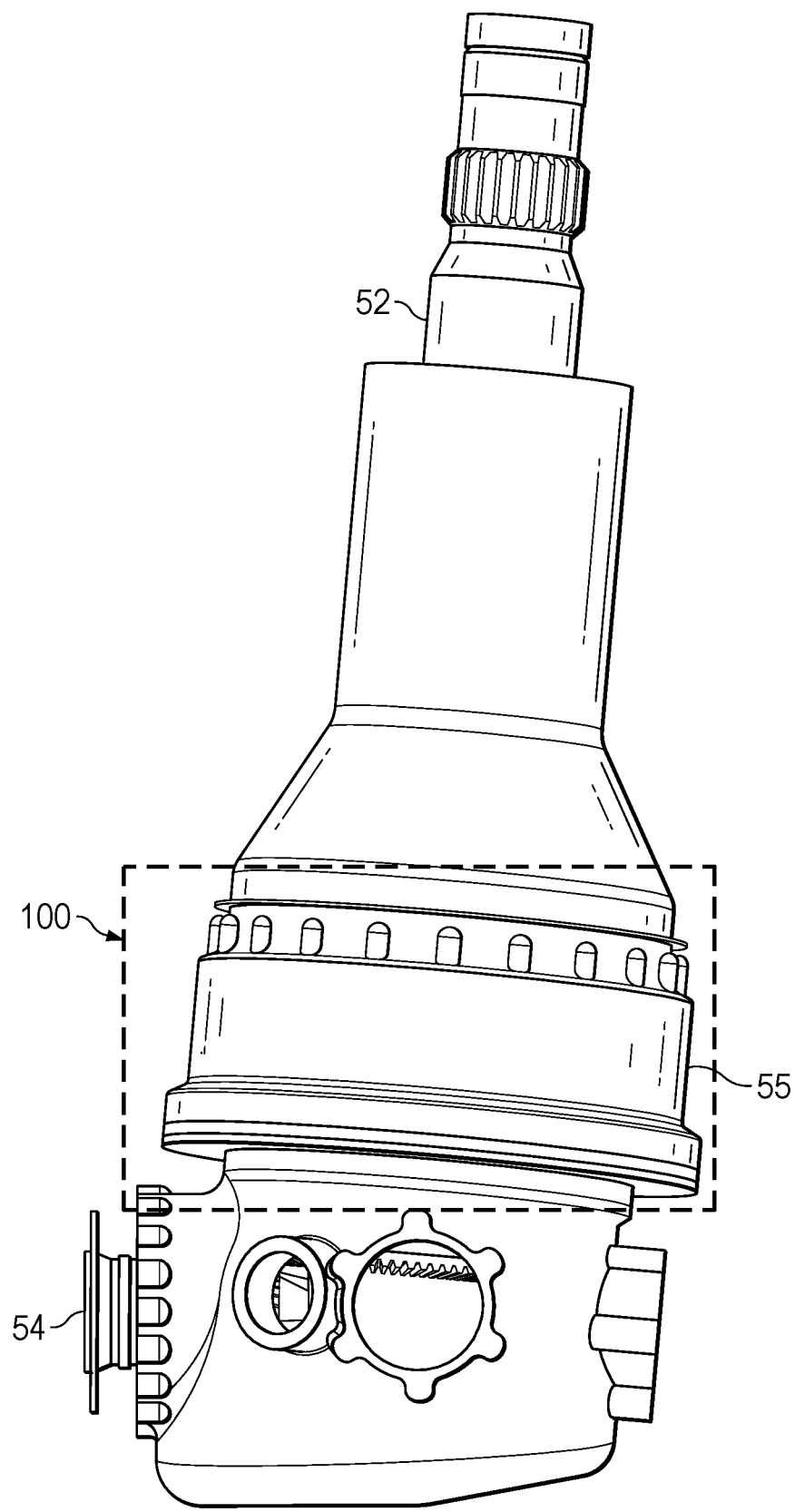
FIGS. 3A-3D show diagrams illustrating a configuration of a compound planetary gear system implemented in accordance with embodiments of the present disclosure.

FIGS. 3A-3D show diagrams illustrating a configuration of a compound planetary gear system 100 implemented in accordance with embodiments of the present disclosure. In particular, as shown in FIG. 3A, compound planetary gear system 100 may be configured for use in an aircraft application, such as part of a rotary wing aircraft (e.g., a helicopter, etc.), as part of a main propeller of a fixed wing aircraft, etc. In embodiments, compound planetary gear system 100 may be positioned within gearbox casing 55 and may be coupled to gearbox input 54, which may represent a rotational force received from a source (not shown). In embodiments, compound planetary gear system 100 may be coupled to rotor mast 52 and may be configured to transfer the input rotational force from gearbox input 54 to the rotor mast 52. In some embodiments, compound planetary gear system 100 may be configured to reduce the speed of the input rotation force received from gearbox input 54 and to output the reduced rotational force to rotor mast 52. Rotor mast 52 may be configured to drive a propeller providing movant power to the aircraft.

Figure 3B:
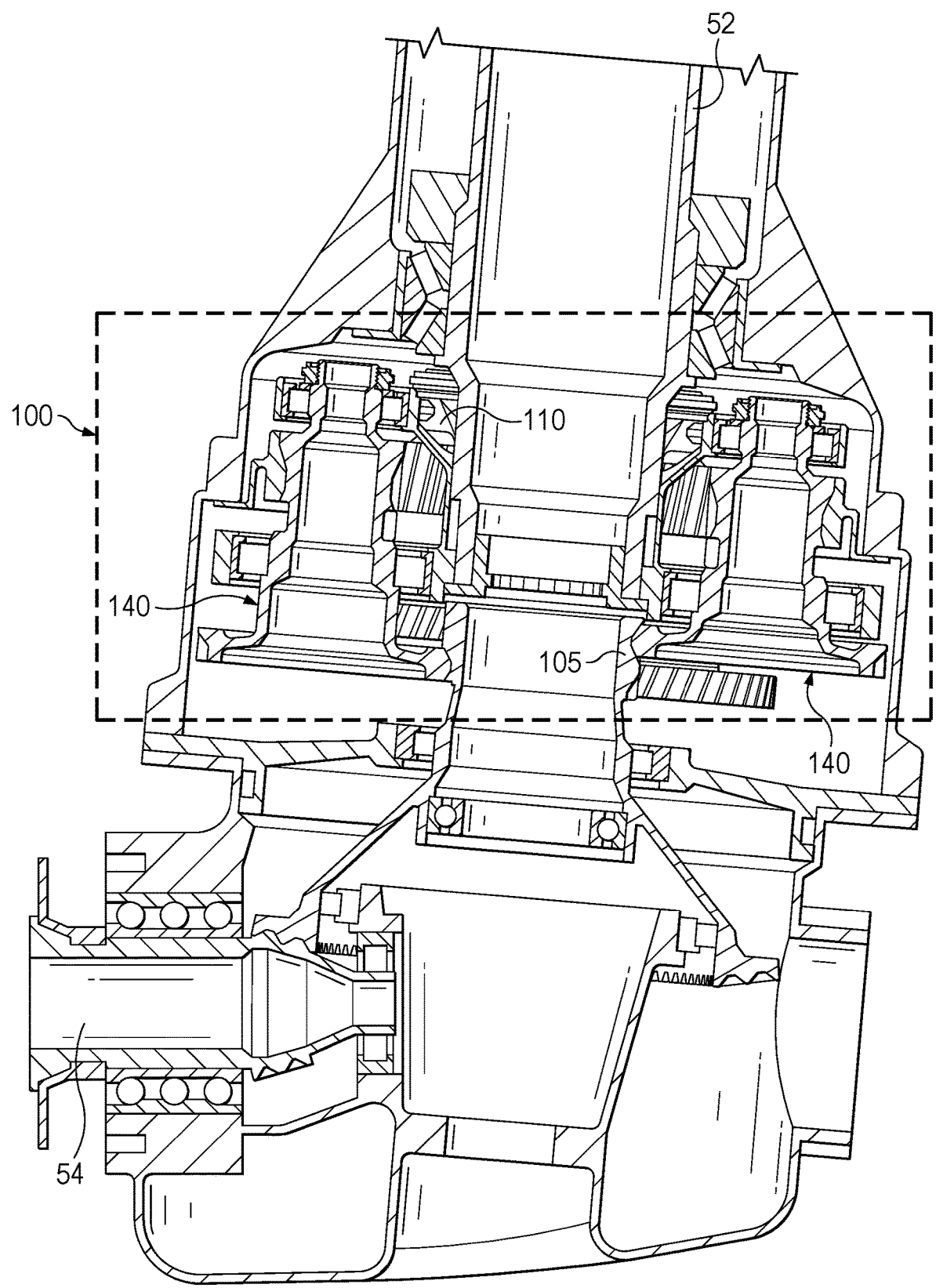
Figure 3C:
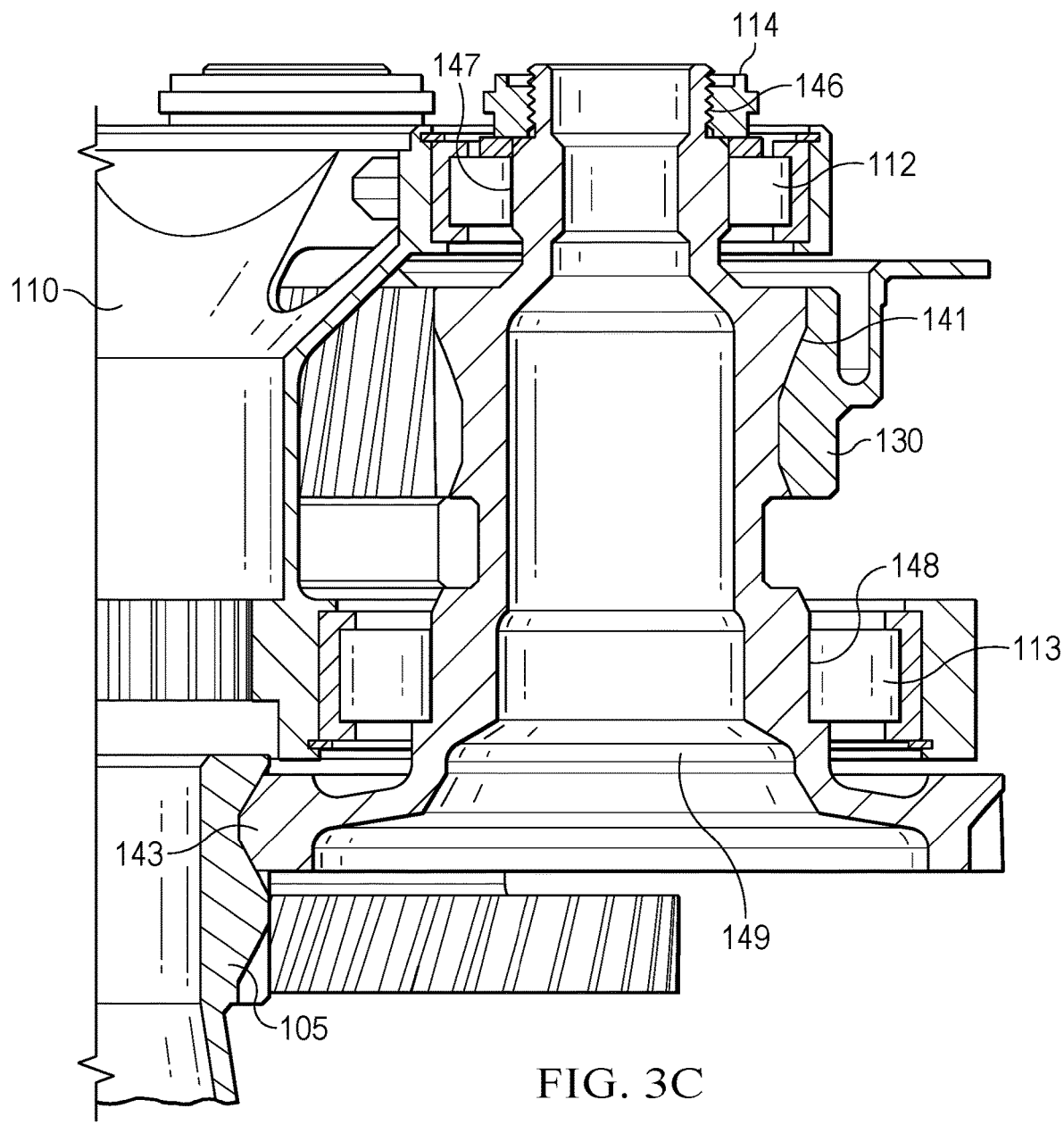

FIG. 3B shows a cross sectional view of compound planetary gear system 100 within gearbox casing 55. As can be seen, compound planetary gear system 100 may include one or more planet pinions 140 surrounding sun gear 105. In embodiments, one or more planet pinions 140 may be configured to balance out the loads experienced within compound planetary gear system 100 in accordance with embodiments of the present disclosure. FIG. 3C, shows a zoomed-in cross sectional view of one of the one or more planet pinions 140 of compound planetary gear system 100. As shown, planet pinion 140 may be mounted and rotatably coupled to carrier 110 of compound planetary gear system 100. Upper end 146 may be mounted to the upper section of carrier 110, and lower end 149 may be mounted to the lower section of carrier 110. In particular, upper bearing raceway 147 may be coupled (e.g., rotatably coupled) to one or more upper bearings 112 of carrier 110, and lower bearing raceway 148 may be coupled (e.g., rotatably coupled) to one or more lower bearings 113 of carrier 110. In embodiments, upper gear 141 may be coupled to ring gear 130, and lower gear 143 may be coupled to sun gear 105. In embodiments, as described above, upper gear 141 may be configured with a helical angle different from the helical angle of lower gear 143 in order to balance the loads (e.g., the axial loads) applied against one or more lower bearings 113 and/or one or more upper bearings 112 of carrier 110 in accordance with embodiments of the present disclosure.

Figure 3D:
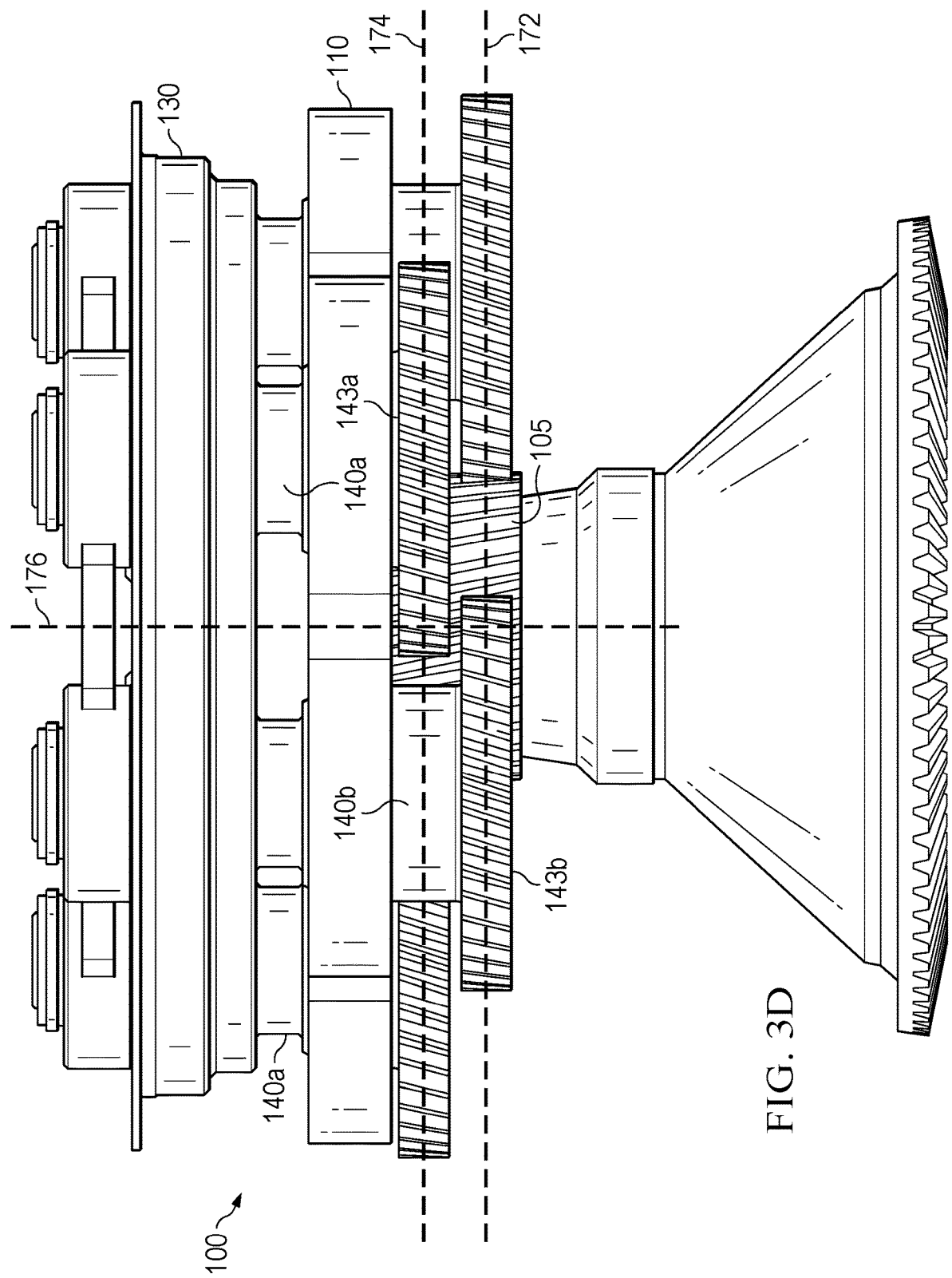

FIG. 3D shows an example of an overlapping configuration of the planet pinions of a compound planetary gear system 100 implemented in accordance with embodiments of the present disclosure. In particular, compound planetary gear system 100 may include a plurality of planet pinions 140 mounted on carrier 110, including first planet pinion 140a and second planet pinion 140b. As can be seen in FIG. 3D, the plurality of planet pinions 140 of compound planetary gear system 100 may be mounted in an overlapping configuration. For example, first planet pinion 140a may include a short configuration (e.g., such as the configuration illustrated in and discussed with respect to FIG. 2F) and second planet pinion 140b may include a long configuration (e.g., such as the configuration illustrated in and discussed with respect to FIG. 2G). In embodiments, the plurality of planet pinions 140 may be diametrically packed onto carrier 110 such that the lower gears of adjacent planet pinions intersect a same vertical line. For example, lower gear 143a of planet pinion 140a and lower gear 143b of planet pinion 140b may both intersect vertical line 176. In this manner, lower gear 143a of planet pinion 140a and lower gear 143b of planet pinion 140b may overlap each other. Moreover, in this example, lower gear 143a of planet pinion 140a may be disposed along plane 174, while lower gear 143b of planet pinion 140b may be disposed along plane 172, which may be different from plane 174. In this case, lower gear 143a may mesh with sun gear 105 at a first point along plane 174 and lower gear 143b of planet pinion 140b may mesh with sun gear 105 at a second point along plane 172. As noted above, the overlapping configuration of compound planetary gear system 100 may allow the diameter of compound planetary gear system 100 to be reduced, as the spacing between the planet pinions 140 may be reduced.

In embodiments, functionality of compound planetary gear system 100 to address deficiencies of typical compound planetary gear systems may include functionality to address problems with the process of assembling a compound planetary gear system. In embodiments, functionality of compound planetary gear system 100 may include functionality to implement a carrier of compound planetary gear system 100 in multiple sections. FIGS. 4A-4F show diagrams illustrating a configuration of a multi-section carrier of a planetary gear system 100 implemented in accordance with embodiments of the present disclosure.

Figure 4A:
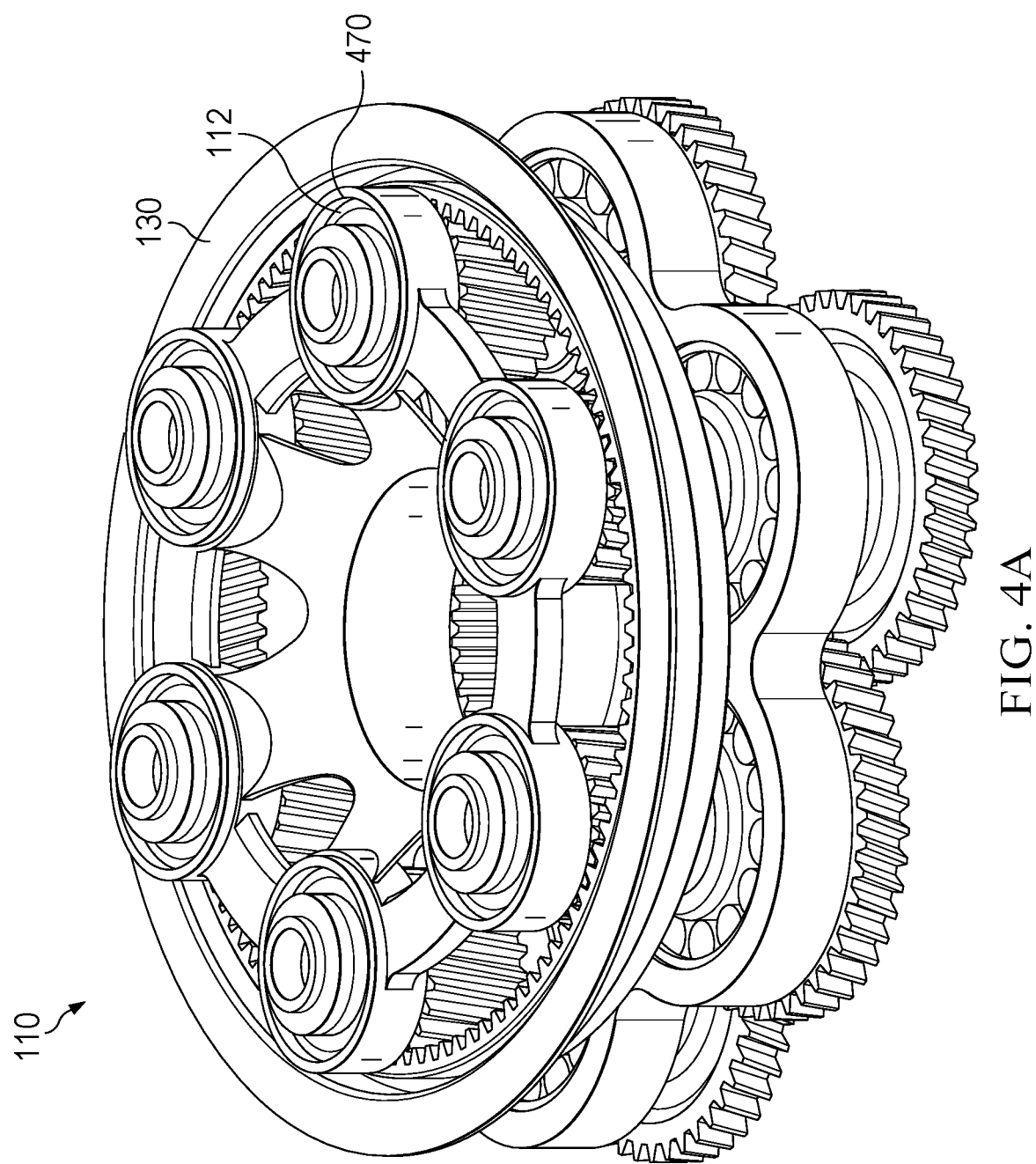
FIGS. 4A-4F show diagrams illustrating a configuration of a multi-section carrier of a planetary gear system implemented in accordance with embodiments of the present disclosure.

As noted above, assembling a typical compound planetary gear system may be quite challenging due to several factors. For example, a compound planetary gear system may have several overlapping and/or overhanging components, which may complicate the installation or removal of components. In a particular example, bearing 112 may be installed within bearing bore 470, which, as seen in FIG. 4A, may overhang. In this case, assembling ring gear 130 may include sliding ring gear 130 overbearing bore 470, which may prove to be very difficult, if not impossible. Even if ring gear 130 can slide over bearing bore 470, damage may occur to one or more components (e.g., the teeth of ring gear 130 or bearing bore 470). In order address these, and other deficiencies, compound planetary gear system 100 may include functionality to implement carrier 110 as a multi-section or multi-piece carrier.

Figure 4B:
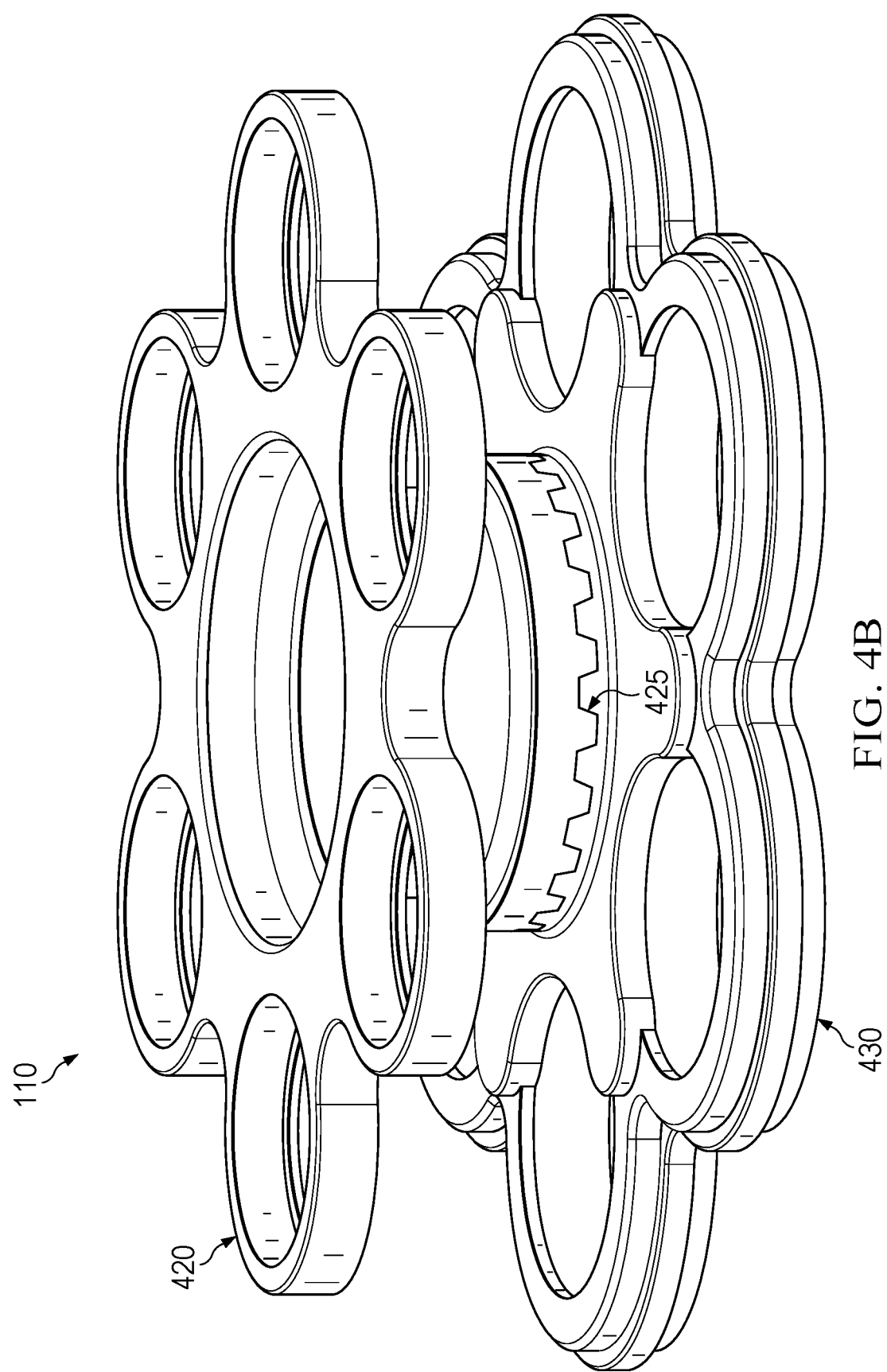

FIG. 4B shows a diagram illustrating a carrier 110 implemented as a multi-piece carrier in accordance with embodiments of the present disclosure. In particular, carrier 110 may be implemented using two sections, namely upper section 420 and lower section 430. In embodiments, upper section 420 may be joined to lower section 430 at joint 425. In embodiments, carrier 110 may be assembled by joining upper section 420 to lower section 430. In embodiments, enabling configuring carrier 110 with upper section 420 and lower section 430 may allow for a more efficient and safer assembly of carrier 110, such as by allowing placement of ring gear 130, or the installation of bearings 112 into bearing bore 470 before the planetary pinions of compound planetary gear system 100 are installed.

Figure 4C:
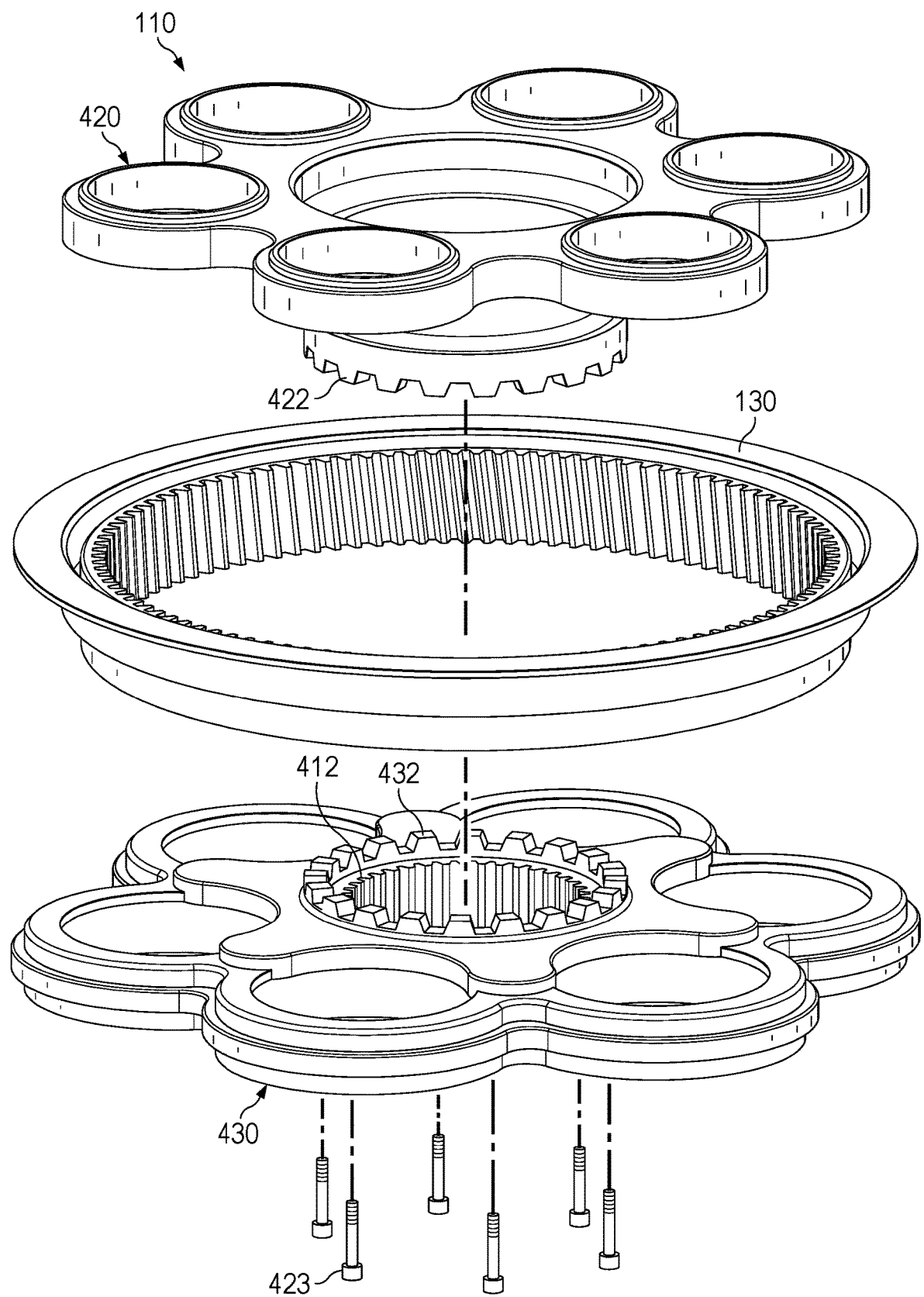

In embodiments, joint 425 for joining upper section 420 to lower section 430 may include one or more curvic joints. FIG. 4C shows a diagram illustrating a breakdown of a carrier 110 implemented as a multi-piece carrier in accordance with embodiments of the present disclosure. As shown in FIG. 4C, one or more curvic joints 422 and/or 432 may be used to join upper section 420 to lower section 430. In embodiments, upper section 420 may be configured with one or more curvic joints 422, and/or lower section 430 may be configured with one or more curvic joints 432. In embodiments, one or more curvic joints 422 may be configured to align and/or to couple to one or more curvic joints 432 to provide an aligned joint between upper section 420 and lower section 430.

Figure 4D:
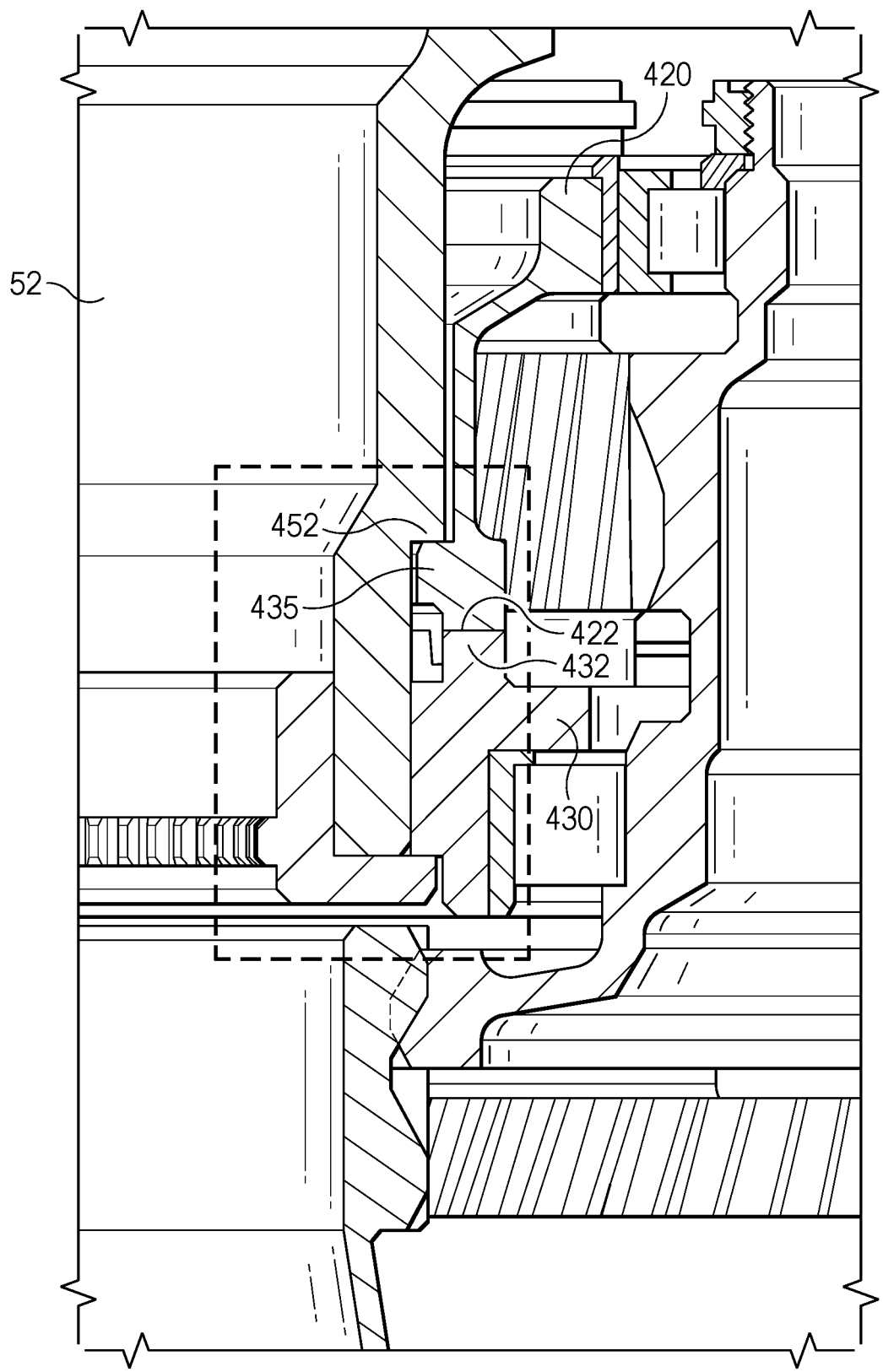
Figure 4E:
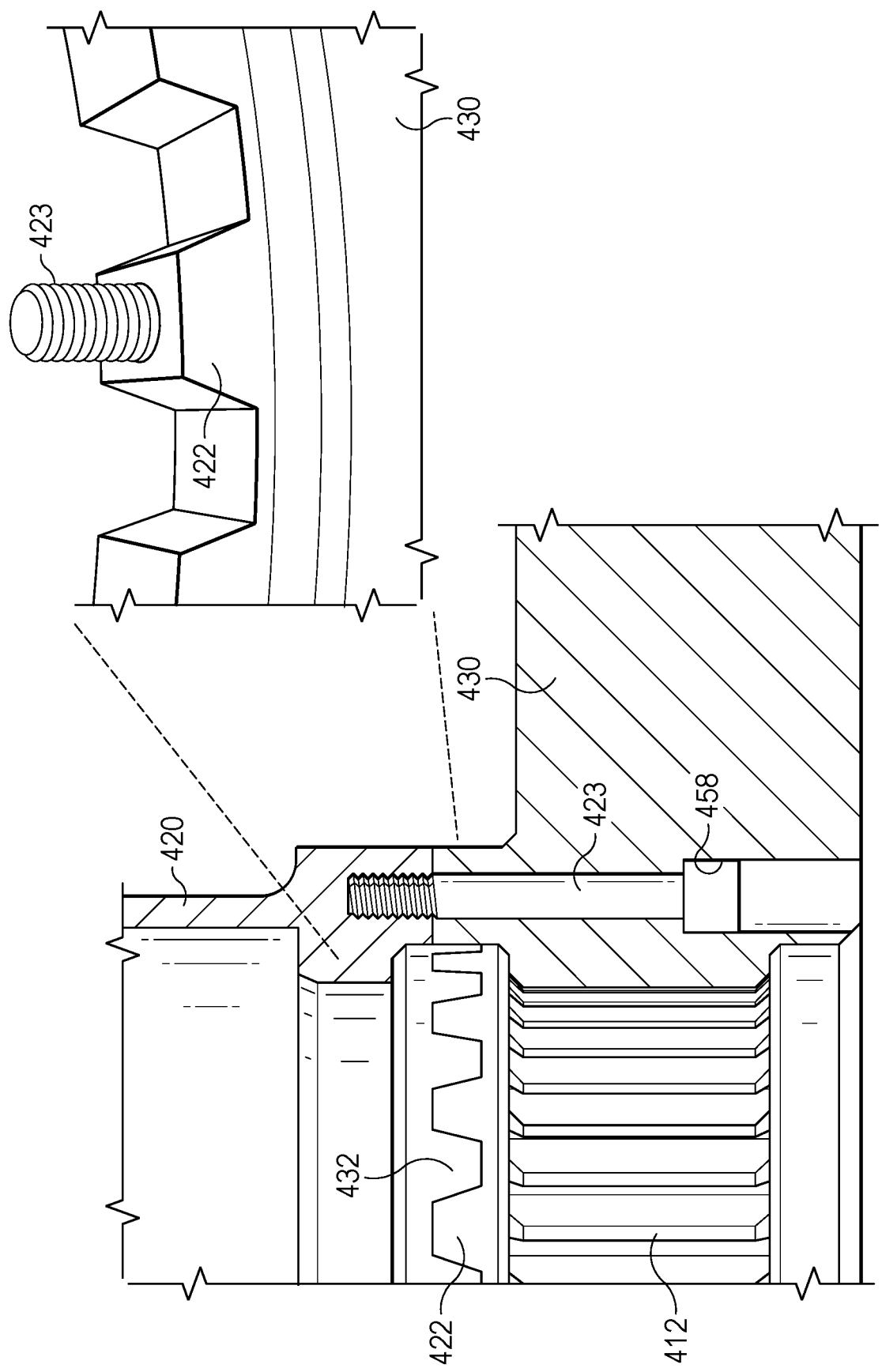

In embodiments, carrier 110 may include one or more fasteners 423 for securing upper section 420 and lower section 430 together. In embodiments, one or more fasteners 423 may include bolts, screws, etc. configured to secure upper section 420 and lower section 430 together. In embodiments, as shown in FIG. 4D, one or more fasteners 423 may be configured to be routed through one or more curvic teeth of the curvic joint between upper section 420 and lower section 430. For example, curvic tooth 422 of lower section 430 may be configured to allow a fastener 423 (e.g., a bolt, a screw, etc.) to be inserted and/or routed through curvic tooth 422 such that the fastener 423 protrudes from the curvic tooth. In embodiments, a curvic surface 432 of upper section 420 configured to receive curvic tooth 422 to form a curvic joint may be configured to allow the portion of fastener 423 protruding from curvic tooth 422 to be inserted into curvic surface 432. In some embodiments, curvic surface 432 may include a threaded hole configured to receive the portion of fastener 423 protruding from curvic tooth 422. In this manner, upper section 420 and lower section 430 may be secured together by joining upper section 420 and lower section 430 such that curvic tooth 422 is coupled to curvic surface 432, and inserting fastener 423 through curvic tooth 422 and into curvic surface 432 (e.g., the threaded hole of curvic surface 432) to secure curvic tooth 422 to curvic surface 432. In some embodiments, fastener 423 may be inserted through a curvic tooth of upper surface 420 and into a curvic surface of lower portion 430 to secure upper section 420 and lower section 43 together. In some embodiments, fastener 423 may include a countersink 458 to ensure that fastener 423 does not protrude from the bottom portion of lower section 430. In some embodiments, the fastener 423 may be inserted through a curvic tooth of the section of carrier 110 that may be composed of a stronger material than the other section. For example, where lower section 430 is composed of a stronger material than upper section 420, fastener 423 may be inserted through a curvic tooth of lower section 430 to secure the curvic joint.

In additional or alternative embodiments, securing upper section 420 and lower section 430 together may include using a mast nut clamping technique. As shown in FIG. 4D, upper section 430 of carrier 110 may include a clamp area 435 configured to abut a retention shoulder 452 of rotor mast 52. In embodiments, the curvic joint between curvic tooth 422 and curvic surface 432 may be secured by clamping clamp area 435 against retention shoulder 452. In embodiments, clamping clamp area 435 against retention shoulder 452 may include the use of a carrier nut (not shown) that may be used to provide a force pushing clamp area 435 against retention shoulder 452. In embodiments, securing upper section 420 and lower section 430 together may include the use of one or more fasteners 423 and/or the mast nut clamping technique in combination or in the alternative, based on operational requirements.

Figure 4F:
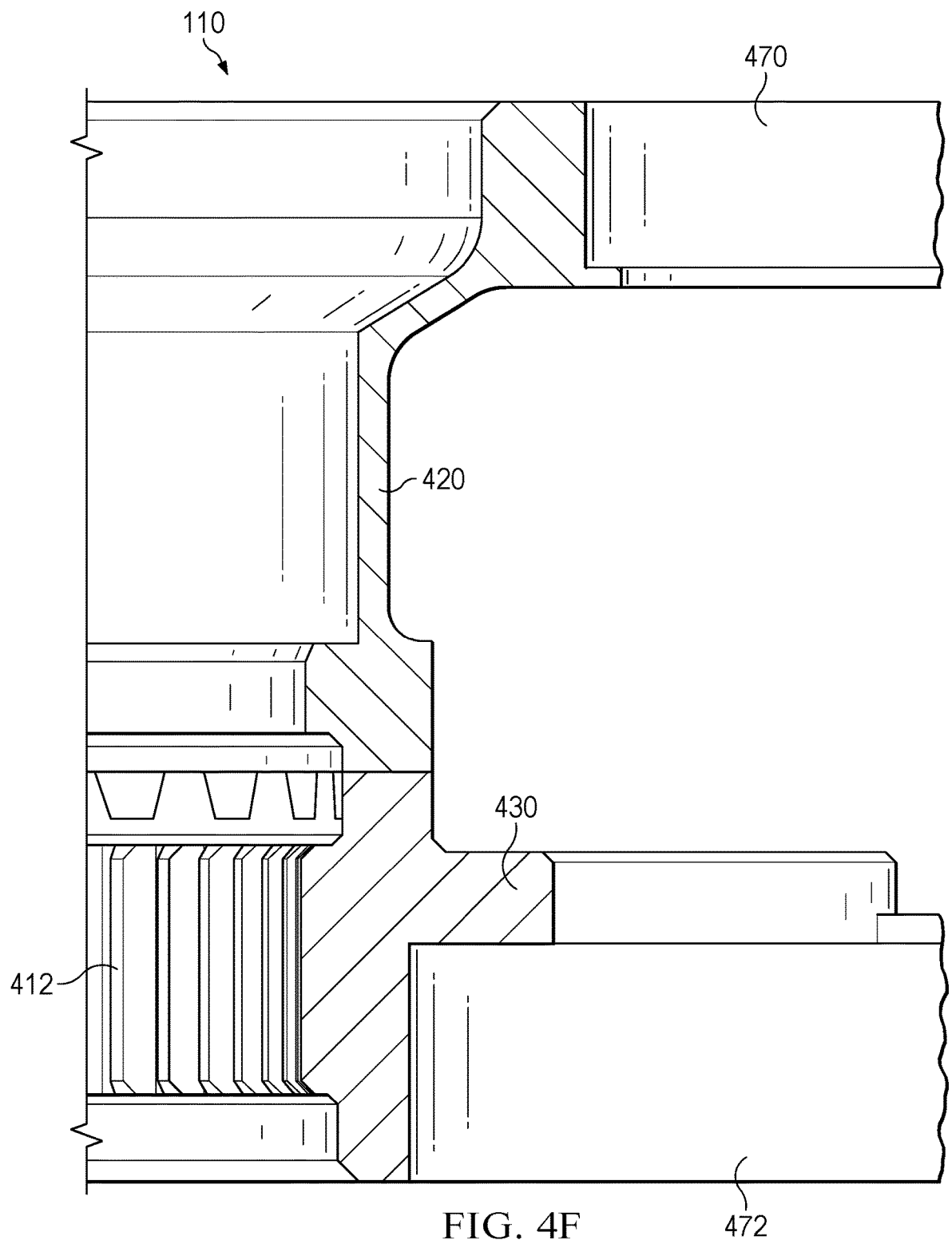

In embodiments, upper section 420 and lower section 430 of carrier 110 may be made using different materials. For example, upper section 420 may be made of a first material different from a second material of which lower section 430 may be made. In embodiments, the first material and the second materials may be selected based on the properties of the materials. For example, in some embodiments, lower section 430 may be made of a second material that is rigid and stronger than the first material of which upper section 420 may be made. In these embodiments, the first material and the second material may be selected to address the relative deflection between the upper and lower bearing bores in order to allow torsional compliance between the upper and lower bearing bores. For example, as shown in FIG. 4F, upper section 420 may be made of a first material that may be configured to allow upper bearing bore 470 to deflect torsionally. In these embodiments, during operations, the loads operating against lower bearing bore 472 may cause lower bearing bore 472 to deflect with respect to upper bearing bore 470 such that upper bearing bore 470 and lower bearing bore 472 may no longer be aligned (e.g., with respect to a vertical axis). However, in accordance with embodiments of the present disclosure, upper section 420 may be made of a first material that may be configured to allow upper bearing bore 470 to follow the deflection of lower bearing bore 472, thereby balancing the deflections experienced by the bearings (e.g., upper bearings and lower bearings) of carrier 110. In some embodiments, the first material used for upper section 420 may include titanium (or other material with similar properties) and the second material used for lower section 430 may include steel (or other material with similar properties).

In embodiments, functionality of carrier 110 for balancing deflections between the upper and lower bearings may include functionality to configure an output gear spline to be inline with the carrier section experiencing (or expected to experience) higher loads. For example, as shown in FIG. 4F, output gear spline 412, which may be configured to mesh with an output gear (e.g., a gear attached to rotor mast 52), may be configured to be inline with lower section 430 of carrier 110. In this example, lower section 430 may be determined (or expected) to experience higher loads (e.g., the bearings of lower section 430 may be determined (or expected) to experience higher loads) than the loads experienced by upper section 420. In this case, output gear spline 412 may be disposed within carrier 110 to be inline with lower section 430. In some embodiments, gear spline 412 may be disposed within carrier 110 to be inline with upper section 420 when upper section 420 is determined (or expected) to experience higher loads than lower section 430.

In additional or alternative embodiments, balancing deflections between the upper and lower bearings may include functionality to include a torsional flexure in one of upper section 420 or lower section 430 of carrier 110. For example, in embodiments, torsional flexure 420 may be included in upper section 420 of carrier 110. In embodiments, torsional flexure 420 may allow upper section 420 to be compliant while at concurrently providing functionality to deflect with respect to lower section 430. For example, the addition of torsional flexure 420 to upper section 420 may enable upper section 420 to flex or deflect in response to deflections of lower section 430. In this manner, upper section 420 may be enabled to follow deflections experienced by lower section 430, thereby balancing the deflections experienced by the upper and lower sections of carrier 110.

In embodiments, the section of carrier 110 in which the torsional flexure is added may be made of a less stiff material than the other section of carrier 110. For example, torsional flexure 420 may be included in upper section 420. In this case, upper section 420 may be configured to be made of a material that is less stiff than the material of which lower section 430 may be made. For example, in some exemplary embodiments, upper section 420 may be made of titanium (or other material with similar properties) and lower section 430 may be made of steel (or other material with similar properties).

It is noted that although the functionality of carrier 110 for balancing deflections is described herein with respect to a two-piece carrier, some of the techniques disclosed herein may also apply to a single-piece carrier. For example, in some embodiments, techniques for adding a torsional flexure to a carrier (e.g., an upper or lower section) may also be applicable for single-piece carriers. In these embodiments, the torsional flexure may be added to a single-piece carrier in order to allow the upper bearings (e.g., the upper bearing bores) to follow deflections of the lower bearings (e.g., the lower bearing bores) to balance the perform deflection balancing.

Figure 5A:
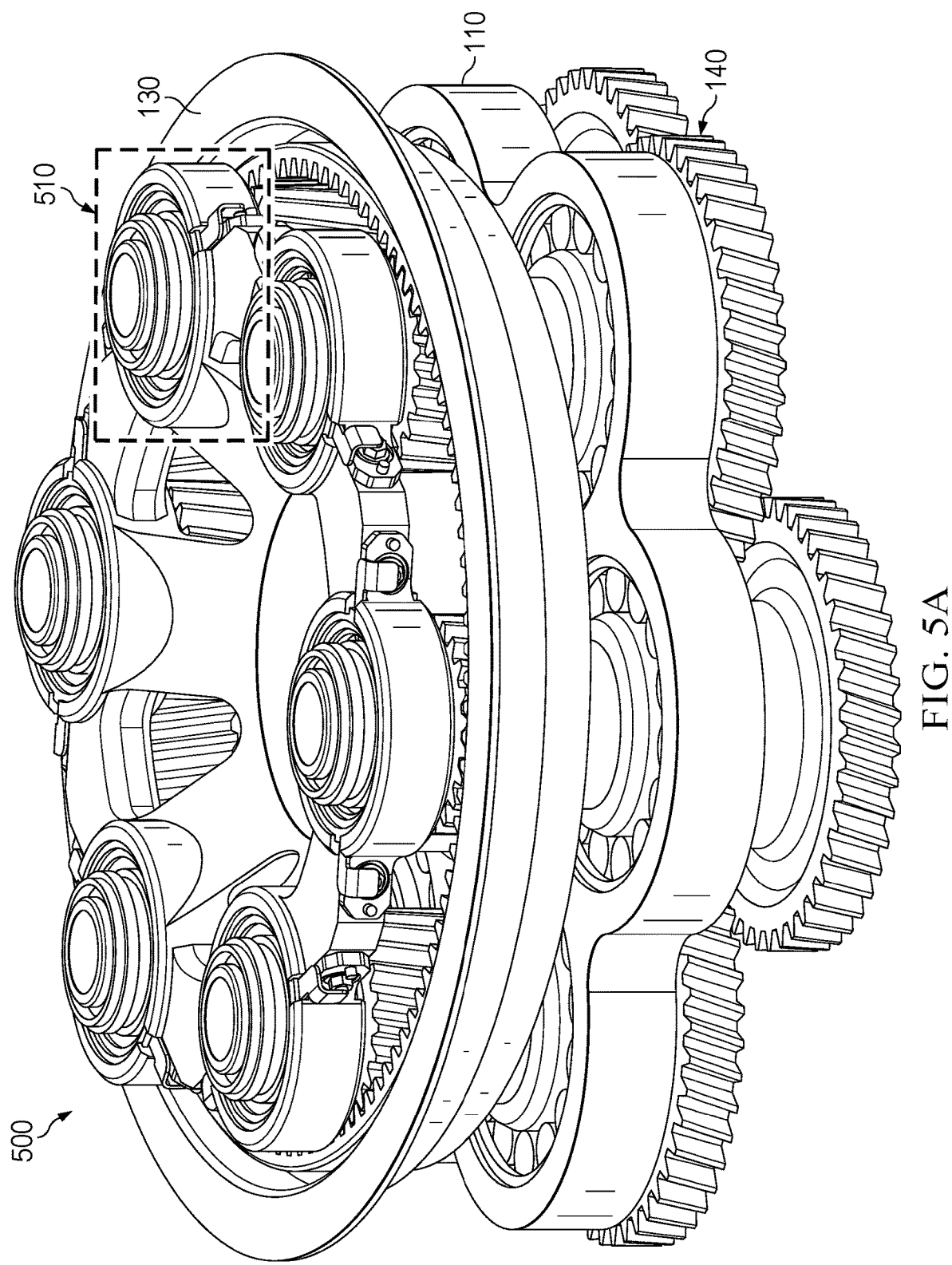
FIGS. 5A-5C show diagrams illustrating an exemplary implementation of a split bearing bore in accordance with embodiments of the present disclosure.
Figure 5B:
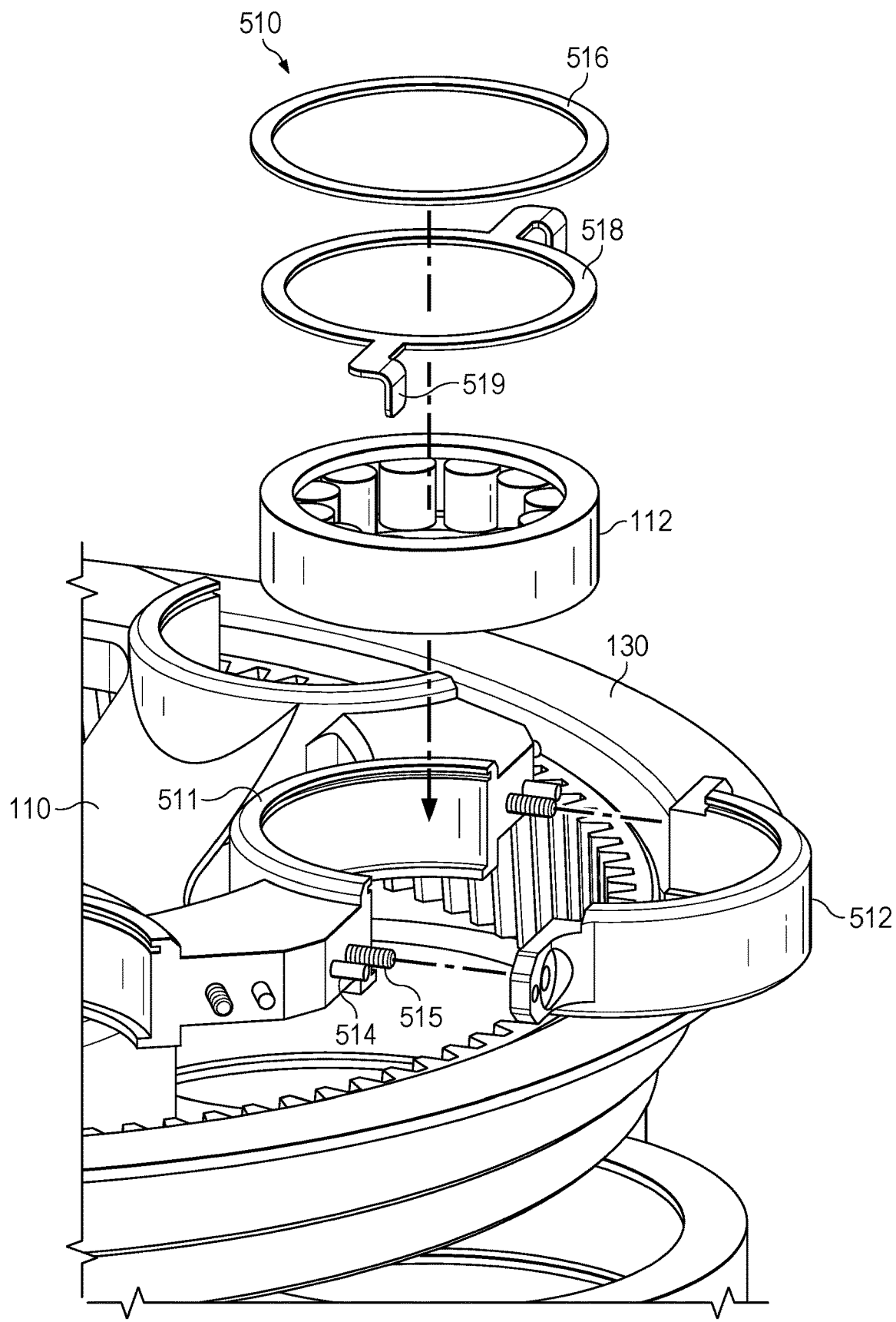
Figure 5C:
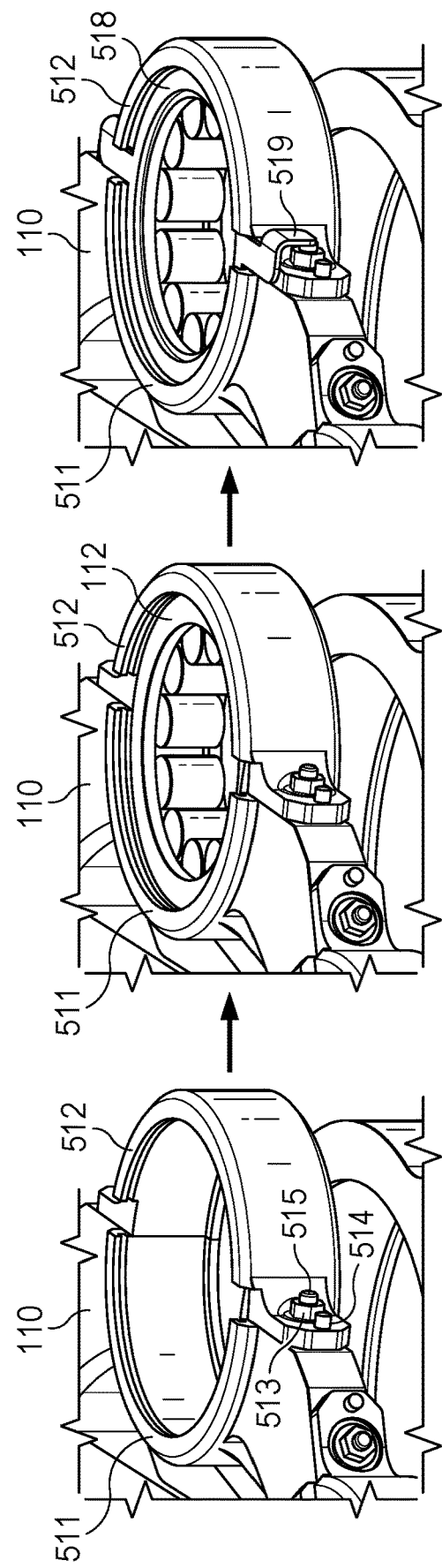

In embodiments, functionality of compound planetary gear system 100 to address problems related to the process of assembling a compound planetary gear system may include implementation of a split bearing bore in accordance with embodiments of the present disclosure. FIGS. 5A-5C show diagrams illustrating an exemplary implementation of a split bearing bore in accordance with embodiments of the present disclosure.

In particular, FIG. 5A shows compound planetary gear system 500 (e.g., which may include compound planetary gear system 100) including a plurality of split bearing bores 510. In embodiments, split bearing bore 510 may be configured to facilitate installation of ring gear 130 over the upper bearing row of carrier 110. For example, as mentioned above, in a typical compound planetary gear system, installing the ring gear may include sliding the ring gear over the upper bearing row (e.g., the upper bearing bores of the upper section of carrier 110) of the compound planetary gear system. For example, with reference to FIG. 2A, it is shown that the inner diameter of ring gear 130 may be smaller than the outer diameter or the upper bearing row including the upper bearing bores of carrier 110. In this case, sliding ring gear 130 over the upper bearing row of carrier 110 may be very difficult, if not impossible. As a consequence, in typical compound planetary gear systems, the overall reduction ratio of the compound planetary gear systems may be limited by the size of the ring gear that may be fitted over upper bearing bores. In some cases, the face width of the ring gear may also be limited in order to be able to slide over the upper bearing row, which may limit the contact surface pressure between the ring gear and the planet pinions that can be handled by the typical compound planetary gear system. In addition, the split bearing bore design of embodiments may allow for a shorter compound planetary carrier, which may provide weight and/or space savings, such as in the amount of space required by a compound planetary system.

With reference back to FIG. 5A, the bearing bores of the upper bearing row of compound planetary gear system 500 may be implemented as split bearing bores to facilitate installation of ring gear 130 over the upper bearing row of carrier 110. FIG. 5B shows a diagram of an exemplary split bearing bore 510 implemented in accordance with embodiments of the present disclosure.

As shown in FIG. 5B, split bearing bore 510 may include bearing holder 511, removable bearing support 512, bearing 112, nut stop bracket 518, and retaining ring 516. In embodiments, bearing 112 (which may be configured in accordance with the description herein) may be configured to be positioned within bearing holder 511. Bearing holder 511 may be structurally part of carrier 110 (e.g., may be of unitary construction with carrier 110) and may be configured to receive bearing 112.

In embodiments, removable bearing support 512 may be configured to be removably coupled to bearing holder 511 and to provide support for bearing 112. In embodiments, when coupled to bearing holder 511, removable bearing support 512 and bearing holder 511 may form a bearing bore into which bearing 112 may be securely mounted. In these embodiments, removable bearing support 512 and bearing holder 511 may form an open enclosure surrounding bearing 112.

In embodiments, bearing holder 511 may include one or more locating pins 514. Locating pins 514 may be configured to index removable bearing support 512 to bearing holder 511. In this manner, locating pins 514 may server to guide and/or align removable bearing support 512 to bearing holder 511. In embodiments, each split bearing bore 510 of carrier 110 may include one or more locating pins 514 configured to index a removable bearing support to the bearing holder of each split bearing bore 510. In embodiments, a locating pin may index a removable bearing support to a bearing holder based on a configuration (e.g., one or more of a size, location, shape, etc.) of the location pin. For example, a first split bearing bore of carrier 110 may include one or more locating pins 514 indexing a first removable bearing support to the bearing holder of the first split bearing bore, and a second split bearing bore of carrier 110 may include one or more locating pins 514 indexing a second removable bearing support to the bearing holder of the second split bearing bore. In embodiments, the configuration (e.g., one or more of a size, location, shape, etc.) of the one or more locating pins 514 indexing the first removable bearing support to the bearing holder of the first split bearing bore may be different from the configuration (e.g., one or more of a size, location, shape, etc.) of the one or more locating pins 514 indexing the second removable bearing support to the bearing holder of the second split bearing bore. In this example, the first removable bearing support may be coupled to the bearing holder of the first split bearing bore, but may not be able to be coupled to the bearing holder of the second split bearing bore, as the locating pins 514 of the second split bearing bore are not configured for the first removable bearing support. In this example, the second removable bearing support may be coupled to the bearing holder of the second split bearing bore, but may not be able to be coupled to the bearing holder of the first split bearing bore, as the locating pins 514 of the first split bearing bore are not configured for the second removable bearing support. In this manner, the locating pins 514 of a bearing holder may be configured to uniquely index a removable bearing support to the bearing holder.

In embodiments, removable bearing support 512 may be secured to bearing holder 511 using a fastener, which may include stud 515 and nut 513 (as shown in FIG. 5C). In embodiments, nut stop bracket 518 may be configured to prevent nut 513 from coming loose and falling away from stud 515. For example, in embodiments, nut stop bracket 518 may include one or more nut stops 519 configured to abut against nut 513 or to abut against the end of stud 515. In this manner, nut 513 may be retained in place by nut stop 519 and may be prevented from coming off from stud 515. A loose nut within compound planetary gear system 500 may cause a great deal of problems and the functionality of nut stop bracket 518 may prevent these problems.

In embodiments, retaining ring 516 may be configured to secure bearing 112 and/or nut stop bracket 518 into split bearing bore 510. In embodiments, bearing holder 511 may include a groove into which retaining ring 516 may be inserted thereby securing retaining ring 516 to split bearing bore 510 and preventing bearing 112 and/or nut stop bracket 518 from coming off split bearing bore 510.

As shown in FIG. 5C, assembly of split bearing bore 510 may include, at step A, positioning removable bearing support 512 into bearing holder 511. In embodiments, positioning removable bearing support 512 into bearing holder 511 may include inserting one or more locating pins 514, which may be uniquely indexed to removable bearing support 512, into removable bearing support 512. In embodiments, removable bearing support 512 may be securely attached to bearing holder 511 by installing nut 513 over stud 515.

In embodiments, at step B, bearing 112 may be inserted into the bearing bore formed by removable bearing support 512 and bearing holder 511. At step C, nut stop bracket 518 may be positioned over bearing 112, such that each nut stop 519 is positioned against the ends of stud 515 to prevent nut 513 from coming loose from stud 515. In embodiments, nut stop bracket 518 may include more than one nut stop 519, each of which may be configured to prevent a respective nut 513 from coming loose from a respective stud 515. In embodiments, retaining ring 516 (not shown in FIG. 5C) may be inserted into a groove of bearing holder 511 to secure retaining ring 516 to split bearing bore 510 and to prevent bearing 112 and/or nut stop bracket 518 from coming off split bearing bore 510.

It is noted that although the functionality of split bearing bore 510 is described herein with respect to compound planetary gear system, the techniques disclosed herein may apply to any planetary gear system. For example, in some embodiments, the split bearing bore of embodiments may also be used in single-stage planetary gear systems and or multi-stage planetary gear systems. As such, the description herein of split bearing bores with respect to a compound planetary gear system is for illustrative purposes and should not be construed as limiting in any way.

Figure 6A:
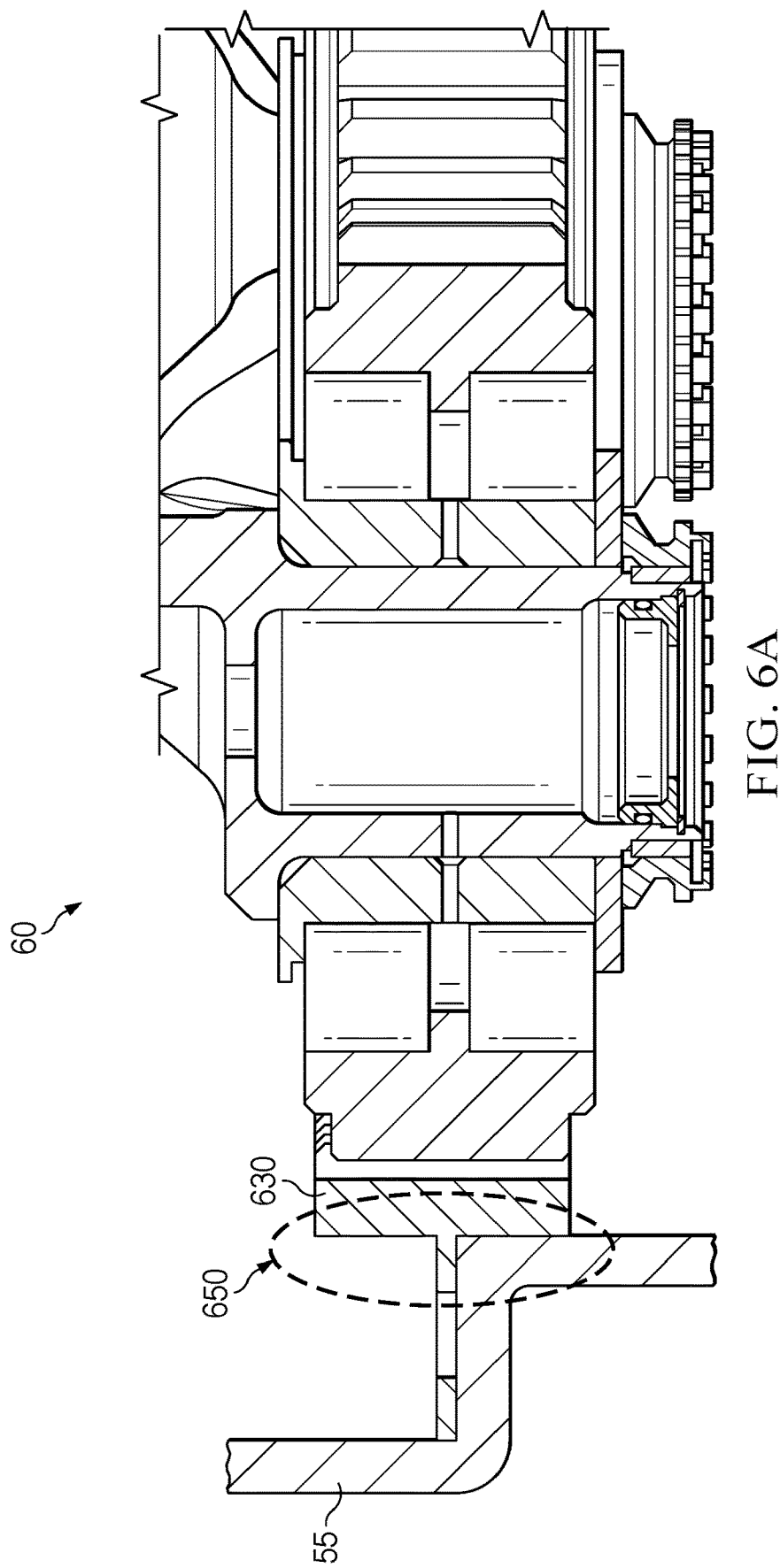
FIG. 6A shows a diagram illustrating a single-stage planetary gear system configured to be mounted on a gearbox casing.
Figure 6B:
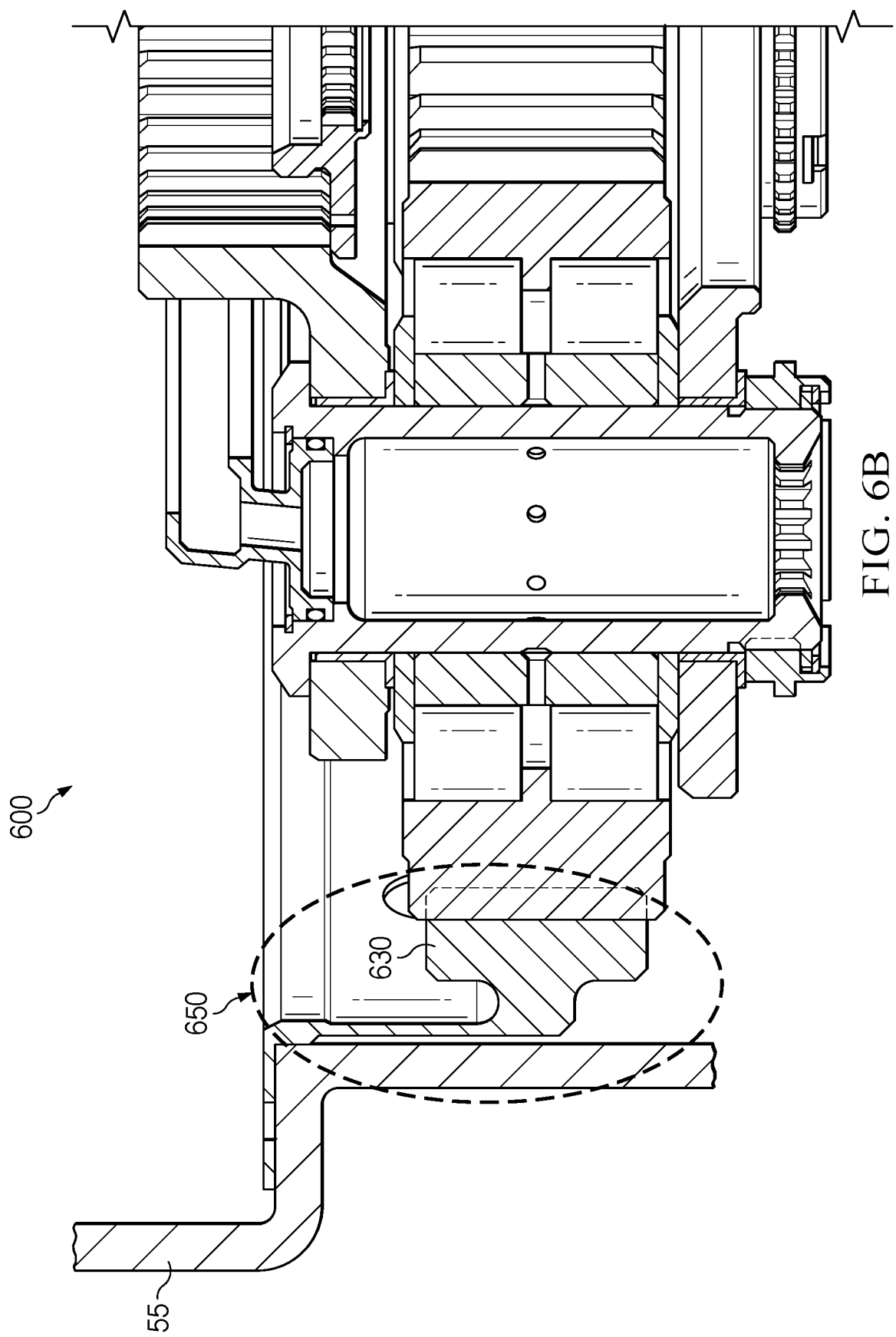
FIG. 6B shows a diagram illustrating a planetary gear system configured to be mounted on a gearbox casing using a flexure mount.

In alternative or additional embodiments, a planetary gear system may be configured to be mounted on a gearbox casing using a flexure mount. For example, FIG. 6B shows a diagram illustrating a planetary gear system 600 configured to be mounted on a gearbox casing using a flexure mount. In this example, as can be seen, the flexure mount 650 may include a flexure applied to gear ring 630, which may then be mounted to gearbox casing 55. In this case, as can be seen, a small gap between ring gear 630 and gearbox casing 55 may be present within the area of flexure mount 650. It is noted that this gap between ring gear 630 and gearbox casing 55 may not be as severe in other planetary gear systems not using the flexure mount (e.g., some single-stage planetary gear systems). For example, FIG. 6A shows a diagram illustrating a single-stage planetary gear system 60 configured to be mounted on a gearbox casing. In the example shown in FIG. 6A, ring gear 630 may abut against gearbox casing 55 without a significant gap between them. In this case, the contact between ring gear 630 and gearbox casing 55 is extensive. Although mounting a gear ring onto a gearbox casing using a flexure mount provides an improvement to the gear running dynamics due the flexibility of the ring gear, a flexure mounted ring gear also creates a disadvantage when it comes to heat transfer.

For example, during operations, a loss of lubrication event may occur, in which lubrication within a planetary gearbox may be lost. Due to the loss of lubrication, heat due to friction between the gears of the planetary gearbox may build up. In loss of lubrication conditions, the ability of the ring gear to wick away heat from the planetary gearbox and transfer the heat to the gearbox casing is very important, as it may provide mitigation to the loss of lubrication event. However, it has been found that, due to the gap between the ring gear and the gearbox casing created by a flexure mount, the heat transfer capability of a traditional flexure mounted ring gear may be greatly diminished.

Figure 6C:
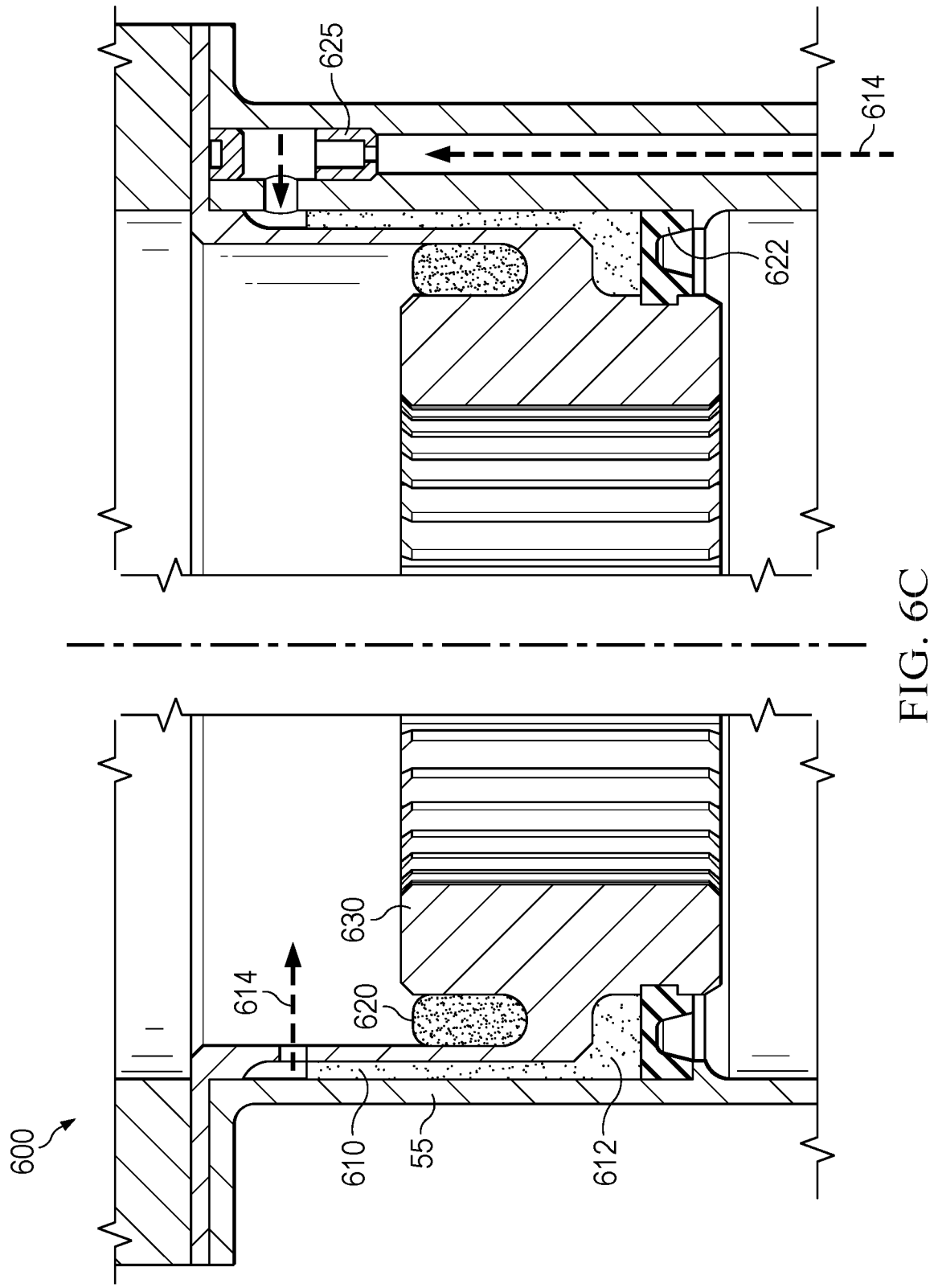
FIG. 6C shows a diagram illustrating a planetary gear system configured with enhanced thermal transfer capability in accordance with embodiments of the present disclosure.

In embodiments, functionality of a planetary gear system 600 implemented in accordance with embodiments of the present disclosure may address the deficiencies of traditional flexure mounted systems. FIG. 6C shows a diagram illustrating a planetary gear system 600 configured with enhanced thermal transfer capability in accordance with embodiments of the present disclosure. As shown in FIG. 6C, planetary gear system 600 may include flex-mounted ring gear 630, gap filler 620, seal 622, and oil meter 625. In embodiments, gap filler 620 may be disposed on the upper side of ring gear 630, and seal 622 may be disposed on the lower side of ring gear 630. In embodiments, seal 622 may be configured to provide an obstruction to the flow of oil 620, which may cause oil 620 to "dam up" or accumulate within the gap between ring gear 630 and gearbox casing 55. In embodiments, the oil 620 may fill the gap between ring gear 630 and gearbox casing 55. In these embodiments, oil 620 may operate to thermally couple ring gear 630 to gearbox casing 55. As oil 620 may fill the entirety or a substantial portion of the gap between ring gear 630 and gearbox casing 55, the heat transfer capacity of ring gear 630 may be enhanced or improved, as oil 620 may serve as a thermal conduction and a substantial portion of the outer surface of ring gear 630 may contact oil 620.

In embodiments, oil 620 accumulated within the gap between ring gear 630 and gearbox casing 55 has been found to increase the transfer of heat from ring gear 630 to gearbox casing 55 by approximately 400% over the transfer of heat without accumulated oil. In embodiments, the heat transfer relationship may scale even higher with a larger ring gear 630's size.

In embodiments, seal 620 may be composed of a flexible material that may provide flexibility to ensure that seal 620 may be compliant with the rest of planetary gear system 600, especially with ring gear 630. In embodiments, seal 620 may be composed of silicone, or any other material with similar properties. In embodiments, seal 620 may be configured to withstand high-temperatures, such as temperatures reached within planetary gear system 600 during a loss of lubrication event.

In embodiments, one or more oil drain back points 610 may be disposed along the ring gear 630. In embodiments, one or more oil drain back points 610 may include one or more holes through which oil 620 may escape. The one or more oil drain back points 610 may be used to control the amount of oil accumulated within the gap between ring gear 630 and gearbox casing 55. In embodiments, one or more oil drain back points 610 may be positioned at a height from seal 620 such that, as oil 620 accumulates within the gap between ring gear 630 and gearbox casing 55 and reaches an oil drain back point 610, oil 620 may escape through the oil drain back point 610.

In embodiments, a sufficiently high oil drain back point 610 may enable oil 620 to remain within the gap between ring gear 630 and gearbox casing 55 even when an oil loss event may occur, in which the oil of planetary gear system 600 may be lost. In this case, oil 620 accumulated within the gap between ring gear 630 and gearbox casing 55 may be used to distribute the oil to other components or areas of planetary gear system 600, thereby preventing or mitigating the potential failure of planetary gear system 600.

In embodiments, planetary gear system 600 may also include functionality related to chip control. For example, in some cases, chips (such as metal chips, etc.) may be present within planetary gear system 600, such as due to degrading performance. In these cases, a chip detector of planetary gear system 600 may detect the presence of these chips and may generate an alert, which may cause a corrective action to be take. However, in some cases, some locations within planetary gear system 600 may act as a chip trap. For example, the gap between ring gear 630 and gearbox casing 55 may often act a chip trap, allowing chips to accumulate behind ring gear 630 and prevent the chips from reaching the chip detector. In a similar manner, the upper side of ring gear 630 may often act as a chip trap.

In embodiments, oil 620 and one or more oil drain back points 610 of planetary gear system 600 may cooperatively operate to flush out chip from potential chip traps of ring gear 630 and to allow the chips to flow and reach the chip detector. In embodiments, one or more oil drain back points 610 may be positioned in locations configured to facilitate the flushing of chips from ring gear 630.

In embodiments, gap filler 620 may be configured to be disposed on the upper section of ring gear 630, within a feature of ring gear 630. Gap filler 620 may be an annulus configured to fill a gap within ring gear 630 that may act as a chip trap. In embodiments, gap filler 620 may prevent chips from accumulating or being trapped within the gap on the upper section of ring gear 630, and may facilitate the chips to flow and reach the chip detector.

Figure 7:
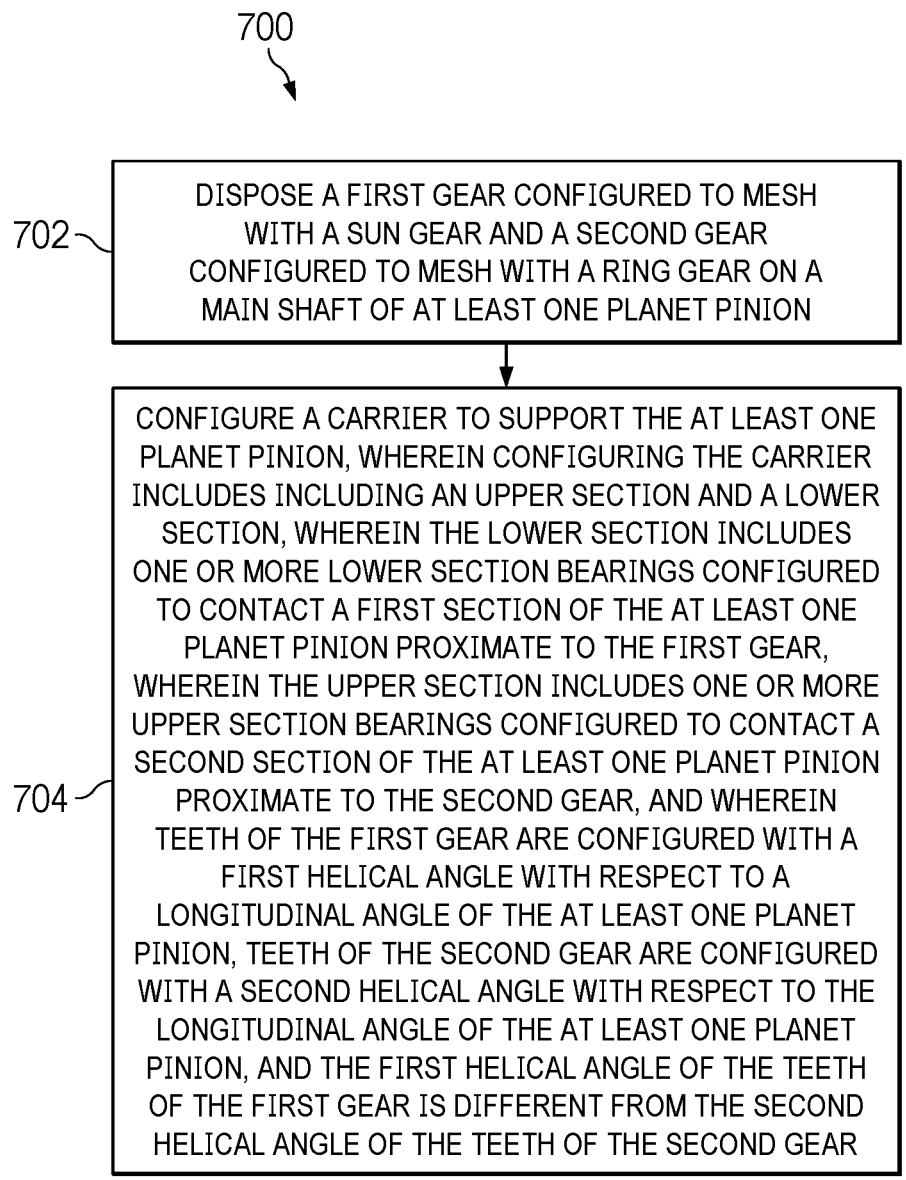
FIG. 7 shows a high-level flow diagram of exemplary operations for manufacturing a compound planetary gear system configured in accordance with embodiments of the present disclosure.

A method of manufacturing a compound planetary gear system in accordance with embodiments of the present disclosure will now be discussed with respect to FIG. 7. FIG. 7 shows an exemplary flow diagram 700 of operations for manufacturing a compound planetary gear system in accordance with embodiments of the present disclosure. For example, the steps illustrated in the example blocks shown in FIG. 7 may be performed to manufacture compound planetary gear system 100, and/or planetary gear system 600 of FIGS. 2A-6C, according to embodiments herein.

At block 702, a first gear configured to mesh with a sun gear and a second gear configured to mesh with a ring gear are disposed on a main shaft of at least one planet pinion. For example, a lower gear (e.g., lower gear 143 as illustrated in FIG. 2F) configured to mesh with a sun gear and a second gear (e.g., upper gear 141 as illustrated in FIG. 2F) configured to mesh with a ring gear are disposed on a main shaft (e.g., main shaft 145 as illustrated in FIG. 2F) of at least one planet pinion (e.g., planet pinion 140 as illustrated in FIG. 2F) according to configuration and functionality described with respect to embodiments of the present disclosure.

At block 704, a carrier is configured to support the at least one planet pinion. For example, a carrier (e.g., carrier 110 as illustrated in FIG. 2A) is configured to support at least one planet pinion (e.g., one or more planet pinions 140 as illustrated in FIG. 2A) according to configuration and functionality described with respect to embodiments of the present disclosure.

In embodiments, configuring the carrier may include including an upper section and a lower section. In embodiments, the lower section may include one or more lower section bearings configured to contact a first section of the at least one planet pinion proximate to the first gear, and the upper section may include one or more upper section bearings configured to contact a second section of the at least one planet pinion proximate to the second gear. In embodiments, teeth of the first gear may be configured with a first helical angle with respect to a longitudinal angle of the at least one planet pinion, teeth of the second gear may be configured with a second helical angle with respect to the longitudinal angle of the at least one planet pinion, and the first helical angle of the teeth of the first gear may be different from the second helical angle of the teeth of the second gear. In embodiments, the teeth of the first gear and the teeth of the second gear may be same handed teeth.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are in-tended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A compound planetary gear system, the compound planetary gear system comprising:
at least one planet pinion including a main shaft having a first gear configured to mesh with a sun gear and a second gear configured to mesh with a ring gear; and
a carrier configured to support the at least one planet pinion, the carrier including an upper section and a lower section, wherein the lower section includes one or more lower section bearings configured to contact a first section of the at least one planet pinion proximate to the first gear, wherein the upper section includes one or more upper section bearings configured to contact a second section of the at least one planet pinion proximate to the second gear, and wherein:
teeth of the first gear are configured with a first helical angle with respect to a longitudinal angle of the at least one planet pinion;
teeth of the second gear are configured with a second helical angle with respect to the longitudinal angle of the at least one planet pinion; and
the first helical angle of the teeth of the first gear is different from the second helical angle of the teeth of the second gear, wherein an angular difference between the first helical angle of the teeth of the first gear and the second helical angle of the teeth of the second gear is based on a load difference between a first load experienced by the first gear and a second load experienced by the second gear, wherein the first helical angle of the teeth of the first gear is smaller than the second helical angle of the teeth of the second gear.

2. The compound planetary gear system of claim 1, wherein one or more of the first helical angle of the teeth of the first gear and the second helical angle of the teeth of the second gear is configured to balance axial loads applied against one or more of the lower section bearings and the upper section bearings due to a torque applied against one or more of the first gear and the second gear of the at least one planet pinion.

3. The compound planetary gear system of claim 1, wherein one or more of the first helical angle of the teeth of the first gear and the second helical angle of the teeth of the second gear is configured to reduce a moment induced by one or more of axial loads and radial loads against one or more of the lower section bearings and the upper section bearings of the at least one planet pinion during rotation of the at least one planet pinion.

4. The compound planetary gear system of claim 1, wherein the first helical angle of the teeth of the first gear and the second helical angle of the teeth of the second gear have the same helical direction.

5. The compound planetary gear system of claim 1, wherein the first helical angle of the teeth of the first gear is larger than the second helical angle of the teeth of the second gear.

6. The compound planetary gear system of claim 1, wherein a diameter of the first gear configured to mesh with the sun gear is larger than a diameter of the second gear configured to mesh with the ring gear.

7. The compound planetary gear system of claim 1, wherein the at least one planet pinion includes a first planet pinion disposed adjacent to a second planet pinion within the compound planetary gear system, and wherein a length of a first shaft of the first planet pinion is larger than a length of a second shaft of the second planet pinion.

8. The compound planetary gear system of claim 7, wherein a first gear of the first planet pinion configured to mesh with the sun gear is disposed along a first plane and a first gear of the second planet pinion configured to mesh with the sun gear is disposed along a second plane different from the first plane, and wherein the first gear of the first planet pinion and the first gear of the second planet pinion overlap such that a line normal to the first plane and the second plane intersects both the first gear of the first planet pinion and the first gear of the second planet pinion.

9. A method of manufacturing a compound planetary gear system, the method comprising:
disposing a first gear configured to mesh with a sun gear and a second gear configured to mesh with a ring gear on a main shaft of at least one planet pinion; and
configuring a carrier to support the at least one planet pinion, wherein configuring the carrier includes including an upper section and a lower section, wherein the lower section includes one or more lower section bearings configured to contact a first section of the at least one planet pinion proximate to the first gear, wherein the upper section includes one or more upper section bearings configured to contact a second section of the at least one planet pinion proximate to the second gear, and wherein:

teeth of the first gear are configured with a first helical angle with respect to a longitudinal angle of the at least one planet pinion;
teeth of the second gear are configured with a second helical angle with respect to the longitudinal angle of the at least one planet pinion; and
the first helical angle of the teeth of the first gear is different from the second helical angle of the teeth of the second gear, wherein an angular difference between the first helical angle of the teeth of the first gear and the second helical angle of the teeth of the second gear is based on a load difference between a first load experienced by the first gear and a second load experienced by the second gear, wherein the first helical angle of the teeth of the first gear is smaller than the second helical angle of the teeth of the second gear.

10. The method of claim 9, wherein one or more of the first helical angle of the teeth of the first gear and the second helical angle of the teeth of the second gear is configured to balance axial loads applied against one or more of the lower section bearings and the upper section bearings due to a torque applied against one or more of the first gear and the second gear of the at least one planet pinion.

11. The method of claim 9, wherein one or more of the first helical angle of the teeth of the first gear and the second helical angle of the teeth of the second gear is configured to reduce a moment induced by one or more of axial loads and radial loads against one or more of the lower section bearings and the upper section bearings of the at least one planet pinion during rotation of the at least one planet pinion.

12. The method of claim 9, wherein the first helical angle of the teeth of the first gear and the second helical angle of the teeth of the second gear have the same helical direction.

13. The method of claim 9, wherein the first helical angle of the teeth of the first gear is larger than the second helical angle of the teeth of the second gear.

14. The method of claim 9, wherein a diameter of the first gear configured to mesh with the sun gear is larger than a diameter of the second gear configured to mesh with the ring gear.

15. The method of claim 9, wherein the at least one planet pinion includes a first planet pinion disposed adjacent to a second planet pinion within the compound planetary gear system, and wherein a length of a first shaft of the first planet pinion is larger than a length of a second shaft of the second planet pinion.

16. The method of claim 15, wherein a first gear of the first planet pinion configured to mesh with the sun gear is disposed along a first plane and a first gear of the second planet pinion configured to mesh with the sun gear is disposed along a second plane different from the first plane, and wherein the first gear of the first planet pinion and the first gear of the second planet pinion overlap such that a line normal to the first plane and the second plane intersects both the first gear of the first planet pinion and the first gear of the second planet pinion.

* * * * *